US 12,342,975 B2

(12) United States Patent
Park et al.

(10) Patent No.: US 12,342,975 B2
(45) Date of Patent: Jul. 1, 2025

(54) DISHWASHER

(71) Applicant: LG Electronics Inc., Seoul (KR)

(72) Inventors: Dong Hwi Park, Seoul (KR); Kyung Rae Kim, Seoul (KR); Myungwon Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 17/863,725

(22) Filed: Jul. 13, 2022

(65) Prior Publication Data

US 2023/0013225 A1    Jan. 19, 2023

(30) Foreign Application Priority Data

Jul. 13, 2021   (KR) .................. 10-2021-0091811

(51) Int. Cl.
| | | |
|---|---|---|
| A47L 15/42 | (2006.01) | |
| A47L 15/48 | (2006.01) | |
| A47L 15/50 | (2006.01) | |
| B01D 46/00 | (2022.01) | |
| B01D 46/24 | (2006.01) | |
| F26B 21/00 | (2006.01) | |

(52) U.S. Cl.
CPC ......... *A47L 15/488* (2013.01); *A47L 15/4202* (2013.01); *A47L 15/4206* (2013.01); *A47L 15/4225* (2013.01); *A47L 15/4246* (2013.01); *A47L 15/4251* (2013.01); *A47L 15/486* (2013.01); *A47L 15/501* (2013.01); *B01D 46/0004* (2013.01); *B01D 46/0043* (2013.01); *B01D 46/2403* (2013.01); *F26B 21/003* (2013.01); *F26B 21/004* (2013.01); *B01D 2273/30* (2013.01); *B01D 2279/55* (2013.01)

(58) Field of Classification Search
None
See application file for complete search history.

(56) References Cited

U.S. PATENT DOCUMENTS

| 4,188,732 | A | 2/1980 | Quayle | |
|---|---|---|---|---|
| 2011/0139195 | A1* | 6/2011 | Jerg | .................... B01D 53/261 |
| | | | | 134/115 R |

FOREIGN PATENT DOCUMENTS

| CN | 208926288 | 6/2019 |
|---|---|---|
| CN | 212307769 | 1/2021 |

(Continued)

OTHER PUBLICATIONS

Extended European Search Report in European Appln. No. 23211674.9, mailed on Mar. 25, 2024, 9 pages.

(Continued)

*Primary Examiner* — Levon J Shahinian
(74) *Attorney, Agent, or Firm* — Fish & Richardson P.C.

(57) ABSTRACT

A dishwasher comprises a tub that defines a wash space configured to accommodate one or more objects to be washed, a sump that is configured to store wash water, a water supply pump that supplies the wash water to the tub, a base that is disposed below the tub, and provides a space to accommodate the sump and the water supply pump, an air supply device that is configured to supply air to the tub, a first filter that is disposed at the base and in fluid communication with the tub and the air supply device, a second filter that is disposed at the base and in fluid communication with the tub, and a water supply that is connected to the second filter and configured to supply the wash water.

10 Claims, 23 Drawing Sheets

(56) References Cited

FOREIGN PATENT DOCUMENTS

| | | |
|---|---|---|
| DE | 102008039896 | 3/2010 |
| DE | 102013103647 | 10/2014 |
| DE | 102015212880 | 1/2017 |
| EP | 2327352 | 6/2011 |
| EP | 3524127 | 8/2019 |
| JP | H0739507 | 2/1995 |
| JP | 2018110789 | 7/2018 |
| KR | 10-2009-0108298 | 10/2009 |
| KR | 20160133935 | 11/2016 |
| KR | 20170011702 | 2/2017 |
| KR | 20180129287 | 12/2018 |
| KR | 20190105887 | 9/2019 |
| KR | 10-2020-0083113 | 7/2020 |

OTHER PUBLICATIONS

Extended European Search Report in European Appln. No. 22184621.5, mailed on Dec. 12, 2022, 4 pages.
Notice of Allowance in Korean Appln. No. 1020220086071, mailed on Nov. 13, 2023, 6 pages (with English translation).

* cited by examiner

DISHWASHER

CROSS-REFERENCE TO RELATED APPLICATION

This application claims priority to and benefit of Korean Patent Application No. 10-2021-0091811, filed on Jul. 13, 2021, which is hereby incorporated by reference as when fully set forth herein.

TECHNICAL FIELD

The present disclosure relates to a dishwasher, and in particular, a dishwasher that provides the functions of hot air drying and filtering.

BACKGROUND

Dishwashers are devices that may spray water to objects to be washed such as cooking vessels, cooking tools, and the like stored therein and wash them. In some cases, detergent can be included in wash water used for a wash.

For instance, dishwashers may include a wash tub defining a wash space configured to receive objects to be washed in the wash tub, a spray arm for spraying wash water into the wash space, and a sump configured to store the wash water and supply the wash water to the spray arm.

Dishwashers may help users to spend less time and efforts in washing the dishes after meals, thereby improving user convenience.

In some cases, a dishwasher may include a discharge duct that is provided at a door and discharges air out of a tub.

SUMMARY

The present application describes a dishwasher that has a structure that can spray air, e.g., hot air, to objects to quickly dry the objects after a washing process is completed with wash water.

For example, the dishwasher can include an air spray structure configured to spray heated air smoothly into a tub that accommodates the objects, where the air spray can save space in the tub. To dry the objects quickly with air, the air spray structure can adjust a direction of the spray of air into the tub. To ensure sanitation, the air spray structure can filter foreign substances included in air spraying into the tub. Additionally, the air spray structure can enable a user to remove the collected foreign substances readily.

According to one aspect of the subject matter described in this application, a dishwasher comprises a tub that defines a wash space configured to accommodate one or more objects to be washed, a sump that is configured to store wash water, a water supply pump that supplies the wash water to the tub, a base that is disposed below the tub, and provides a space to accommodate the sump and the water supply pump, an air supply device that is configured to supply air to the tub, a first filter that is disposed at the base and in fluid communication with the tub and the air supply device, a second filter that is disposed at the base and in fluid communication with the tub, and a water supply that is connected to the second filter and configured to supply the wash water. The first filter is disposed to be spaced from the sump on one lateral direction of the tub, and the second filter is disposed to be spaced from the sump on the other lateral direction of the tub.

The first filter comprises a casing that defines an accommodation space, an air filter disposed in the accommodation space of the casing and configured to filter foreign substances in air, and a cap mounted on the casing to replace the air filter, wherein the cap is disposed to protrude from a bottom surface of the tub to be exposed inside the tub.

The casing comprises a stopper that protrudes from a surface of the casing and has a ring shape and protrudes radially outward. The casing has a first side that is in fluid communication with the tub and a second side that is in fluid communication with the air supply device, and wherein the cap is detachably disposed at the casing. At least a portion of the casing is configured to be exposed to the bottom surface of the tub based on the cap being detached from the casing. The casing passes through a first penetration hole provided on the bottom surface of the tub, and at least a part of the casing is exposed.

The casing comprises an air suction part formed so that external air is suctioned in the radial direction of the air filter toward the center of the air filter, and wherein air suctioned in through the air suction part descends to a lower part of the air filter and is supplied to the air supply device.

The air supply device comprises a housing that defines a flow path configured to guide the air, the housing having an outlet configured to discharge the air from the flow path, an air blowing fan disposed in the housing and configured to cause the air to flow along the flow path, and a heater that is at least partially disposed in the housing and configured to heat the air blown by the air blowing fan. The first filter and the heater are in fluid communication with each other, and the air blowing fan is disposed between the first filter and the heater.

The tub further defines a first penetration hole at the bottom surface of the tub, the first filter being disposed in the first penetration hole, and a second penetration hole at the bottom surface of the tub, the second filter being disposed in the second penetration hole.

According to another aspect of the subject matter described in this application, a dishwasher comprises a tub that defines a wash space configured to accommodate one or more objects to be washed, a sump that is configured to store wash water, a water supply pump that supplies the wash water to the tub, a base that is disposed below the tub, and provides a space to accommodate the sump and the water supply pump, an air supply device that is disposed at the base and configured to supply air to the tub, and a guide vane that is configured to control a direction of the spray of air spraying to the tub. The tub comprises an opening into which air flows from the air supply device, and a first forming part which is depressed in the portion where the opening is formed, wherein the guide vane is disposed in the first forming part, and inserted into the opening.

The opening is provided in plurality, and each of the openings is arranged to be spaced from each other in the front-rear direction of the tub. The plurality of openings are disposed at the central portion of the side of the tub.

The dishwasher further comprises a lower rack that is disposed in the wash space and store object to be washed, an upper rack that is disposed over the lower rack and store object to be washed, a first holder that is disposed in the tub, and on which the lower rack is held, and a second holder that is disposed in the tub, disposed over the first holder, and on which the upper rack is held, wherein the opening is disposed between the first holder and the second holder. The tub further comprises a second forming part that is formed in the upper portion of the first forming part in a position where at least a portion of the second forming part overlaps the upper rack in a way that a inner surface of a lateral plate of the tub is depressed outward.

The air supply device comprises a housing that defines a flow path configured to guide the air, an air blowing fan disposed in the housing and configured to cause the air to flow along the flow path, and a heater that is at least partially disposed in the housing and configured to heat the air blown by the air blowing fan, wherein the dishwasher further comprises a guide duct that one side communicates with an outlet of the housing and the other side communicates with the opening. The guide duct further comprises a division vane that is configured to divide at least a portion of a flow path that faces a plurality of openings, divides a position where each of the plurality of openings is disposed, and guide air to each of the plurality of openings.

The guide vanes and the openings are provided in plurality, and each of the plurality of guide vanes is mounted on each of the plurality of openings to change a direction of the flow of air flowing into the openings. The plurality of guide vanes change a direction of the flow of air flowing into the opening such that air sprays into the tub in the same direction. The plurality of guide vanes change a direction of the flow of air flowing into the opening such that air sprays into the tub in different directions.

In some implementations, Since a plurality of openings are provided, air may smoothly flow into the tub from the air supply device. In addition, since the plurality of openings are provided, the spray directions of an air flowing into the tub through each opening can be adjusted to be the same direction or different directions from each other.

In some implementations, where a first forming part is formed and accommodates a portion of a guide vane, protruding from the tub, a reduction in the storage space of the tub or the interference between the upper rack and the lower rack, which may be caused by the protruding portion of the guide vane, can be suppressed effectively.

In some implementations, the user can adjust a slant direction of wings of the guide vane to vary a direction of air flowing into the tub, considering wash conditions such as the amount, sorts and arrangement positions of objects to be washed placed in the tub, thereby enhancing efficiency of air drying.

In some implementations, the first filter can be coupled to the air supply device and have an air filter mounted thereon such that the air filter filters foreign substances such as dust and the like included in air, improving a sanitation level of the dishwasher.

In some implementations, where a distance between the first filter and the opening formed on a lateral plate of the tub is minimized, a flow path of air from the first filter to the opening can be simplified, thereby improving volumetric efficiency of the dishwasher and ensuring a simple structure of the dishwasher.

Specific effects are described along with the above-described effects in the section of detailed description.

DETAILED DESCRIPTION

Figure 1:
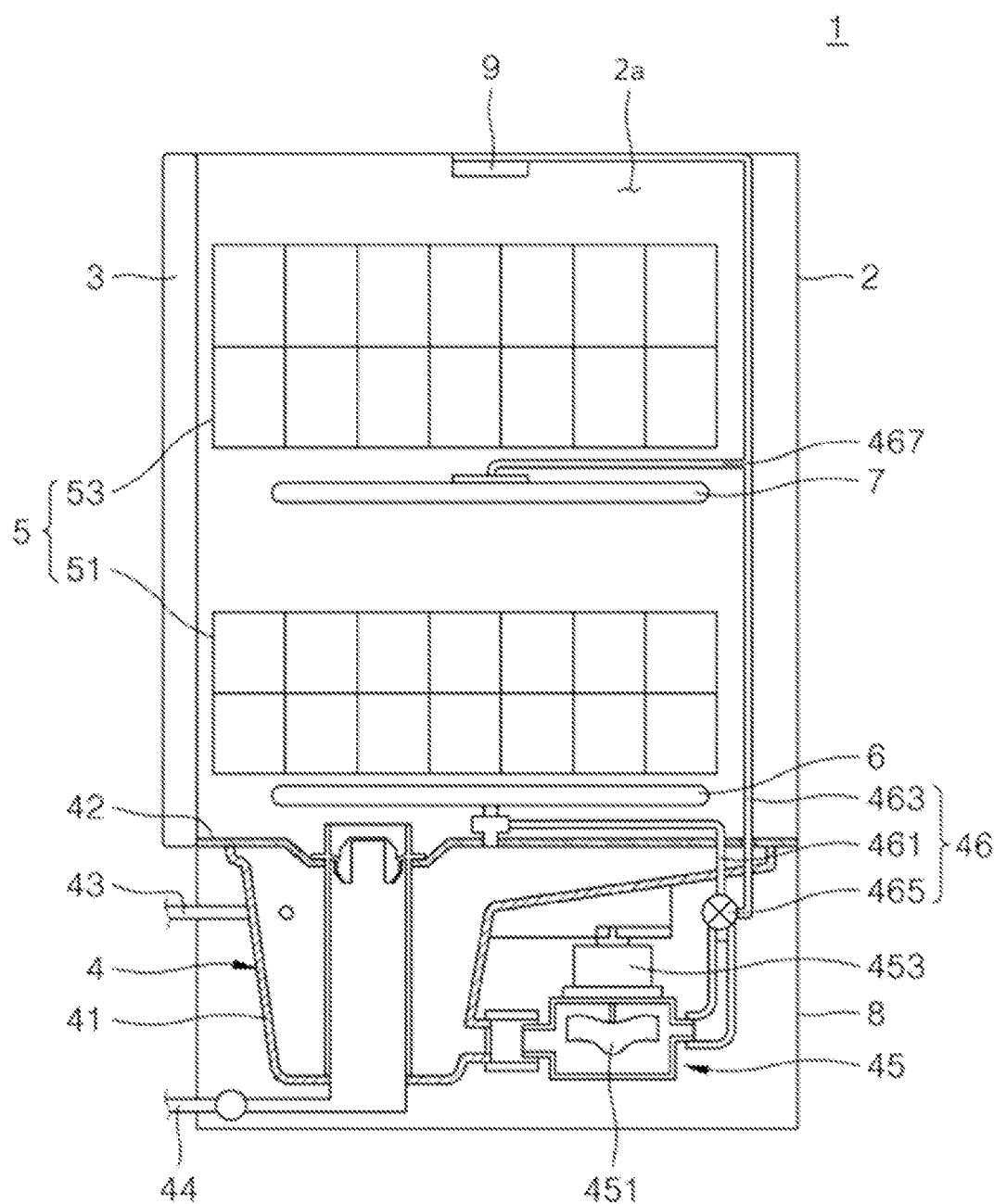
FIG. 1 is a schematic cross-sectional view showing an example of a dishwasher.

The above-described aspects, features and advantages are specifically described hereafter with reference to the accompanying drawings.

Throughout the disclosure, an "up-down direction" denotes an up-down direction of a dishwasher in a state in which the dishwasher is installed for use. A "left-right direction" denotes a direction orthogonal to the up-down direction, and a "front-rear direction" denotes a direction orthogonal to the up-down direction and the left-right direction. "Both lateral directions" or a "lateral direction" can have the same meaning as the left-right direction. These terms can be interchangeably used in the disclosure.

In the drawings, the z-axis direction can denote the up-down direction, the y-axis direction can denote both the lateral directions, the lateral direction or the left-right direction, and the x-axis direction can denote the front-rear direction.

FIG. 1 is a schematic cross-sectional view showing an example of a dishwasher 1.

In some implementations, referring to FIG. 1, the dishwasher 1 can include a housing forming the exterior of the dishwasher 1, a tub 2 define a wash space 2*a* in the housing and accommodating an object to be washed, a door 3 selectively opening and closing the wash space 2*a*, a sump 4 being disposed in the lower portion of the tub 2 and storing wash water, a storage part 5 being disposed in the tub 2 and storing an object to be washed, and spray arms 6, 7, 9 spraying wash water to an object to be washed being stored in the storage part 5. The object to be washed can be cooking vessels such as a bowl, a dish, a spoon, chop sticks and the like, and other cooking tools, for example. Hereafter, the object to be washed can be referred to as a cooking vessel.

The tub 2 can define the wash space 2*a* and accommodate cooking vessels, and the storage part 5 and the spray arms 6, 7, 9 can be provided in the wash space 2*a*. The tub 2 has a shape in which one surface is open, and the open one surface can be opened and closed by the door 3.

The door 3 can be rotatably connected to the housing and configured to selectively open and close the wash space 2a. For example, the lower portion of the door 3 can be hinge-coupled to the housing.

In some implementations, the door 3 can rotate around a hinge, and open and close the tub 2. When the door 3 is open, the storage part 5 can be withdrawn out of the dishwasher 1, and the storage part 5 withdrawn outward can be supported by the door 3.

The sump 4 can include a storage part 41 storing wash water, a sump cover 42 distinguishing the storage part 41 from the tub 2, a water supply 43 supplying wash water to the storage part 41 from the outside, a water discharge part 44 discharging wash water of the storage part 41 outward, and a water supply pump 45 and a supply channel 46 for supplying wash water of the storage part 41 to the spray arms 6, 7, 9.

The sump cover 42 can be disposed in the upper portion of the sump 4, and distinguish the tub 2 from the sump 4. Additionally, the sump cover 42 can be provided with a plurality of return holes for returning wash water having sprayed to the wash space 2a through the spray arms 6, 7, 9.

That is, wash water having sprayed from the sprays arms 6, 7, and 9 can fall to the lower portion of the wash space 2a, pass through the sump cover 42, and return to the storage part 41 of the sump 4.

The water supply pump 45 can be disposed in a lateral portion or the lower portion of the storage part 41, and supply wash water to the spray arms 6, 7, 9 and the tub 2.

One end of the water supply pump 45 can connect to the storage part 41, and the other end can connect to the supply channel 46. The water supply pump 45 can have an impeller 451, a motor 453 and the like, therein. As the motor 453 is supplied with power, the impeller 451 can rotate, and wash water in the storage part 41 can be supplied to the spray arm 6, 7, 9 through the supply channel 46.

The supply channel 46 can selectively supply wash water supplied from the water supply pump 45 to the spray arm 6, 7, 9.

The supply channel 46 can include a first supply channel 461 connecting to a lower spray arm 6, a second supply channel 463 connecting to an upper spray arm 7 and a top nozzle or spray arm 9, and a supply channel diverting valve 465 selectively opening and closing the supply channels 461, 467. The supply channel diverting valve 465 can control the supply channels 461, 463 such that each of the supply channels 461, 463 is opened consecutively or simultaneously.

At least one of storage parts 5 for storing cooking vessels can be provided in the wash space 2a. The dishwasher 1 is provided with two storage parts 5 is illustrated in FIG. 1, but not limited.

For example, the dishwasher 1 can include a single storage part or three or more of storage parts. The number of the spray arms can vary depending on the number of the storage parts.

The storage part 5 can include a lower rack 51 and an upper rack 53 that are used for storing cooking vessels. The lower rack 51 can be disposed in the wash space 2a and store cooking vessels. The upper rack 53 can be disposed over the lower rack 51 and store cooking vessels. A top rack can be disposed in a space between the upper side of the upper rack 53 and the top nozzle or spray arm 9, and the top rack can store cooking vessels.

The lower rack 51 can be disposed over the sump 4, and the upper rack 53 can be disposed further upward than the lower rack 51. The lower rack 51 and the upper rack 53 and the top rack can be withdrawn outward through one open surface of the tub 2.

For instance, a rail-type holder can be disposed on the inner circumferential surface of the tub 2, and a wheel is provided under the racks 51, 53. A user can withdraw the storage part 5 outward, to sore cooking vessels or take out cooking vessels having cleaned.

The spray arms can be disposed in the tub 2 and spray wash water toward cooking vessels in the storage part 5. The spray arms can include a lower spray arm 6, an upper spray arm 7 and a top nozzle or spray arm 9.

The lower spray arm 6 can be rotatably provided under the lower rack 51, and spray wash water to cooking vessels. The upper spray arm 7 can be rotatably provided between the lower rack 51 and the upper rack 53, and spray wash water to cooking vessels.

The lower spray arm 6 can be rotatably mounted on the sump cover 42 and spray wash water to the cooking vessels stored in the lower rack 51. The upper spray arm 7 can be disposed over the lower spray arm 6 and spray wash water to the cooking vessels stored in the upper rack 53. The top nozzle or spray arm 9 can be disposed in the upper portion of the wash space 2a and spray wash water to the lower rack 51 and the upper rack 53.

As described above, the first supply channel 461 can supply wash water to the lower spray arm 6, and the second supply channel 463 can supply wash water to the upper spray arm 7 and the top nozzle or spray arm 9.

Referring to FIG. 1, the dishwasher 1 can include a base 8. The base 8 can be disposed under the tub 2, and a machine room is formed in the base 8, and the tub 2 can be mounted on the base 8. The base 8 can provide space accommodating the sump 4 the water supply pump 45, and accommodating a pump, an air supply device 100, a first filter 200 and various types of devices provided for the dishwasher 1.

The base 8 can have an outer wall, support the dishwasher 1 entirely, and form space in which various types of devices are accommodated with the outer wall.

Figure 2:
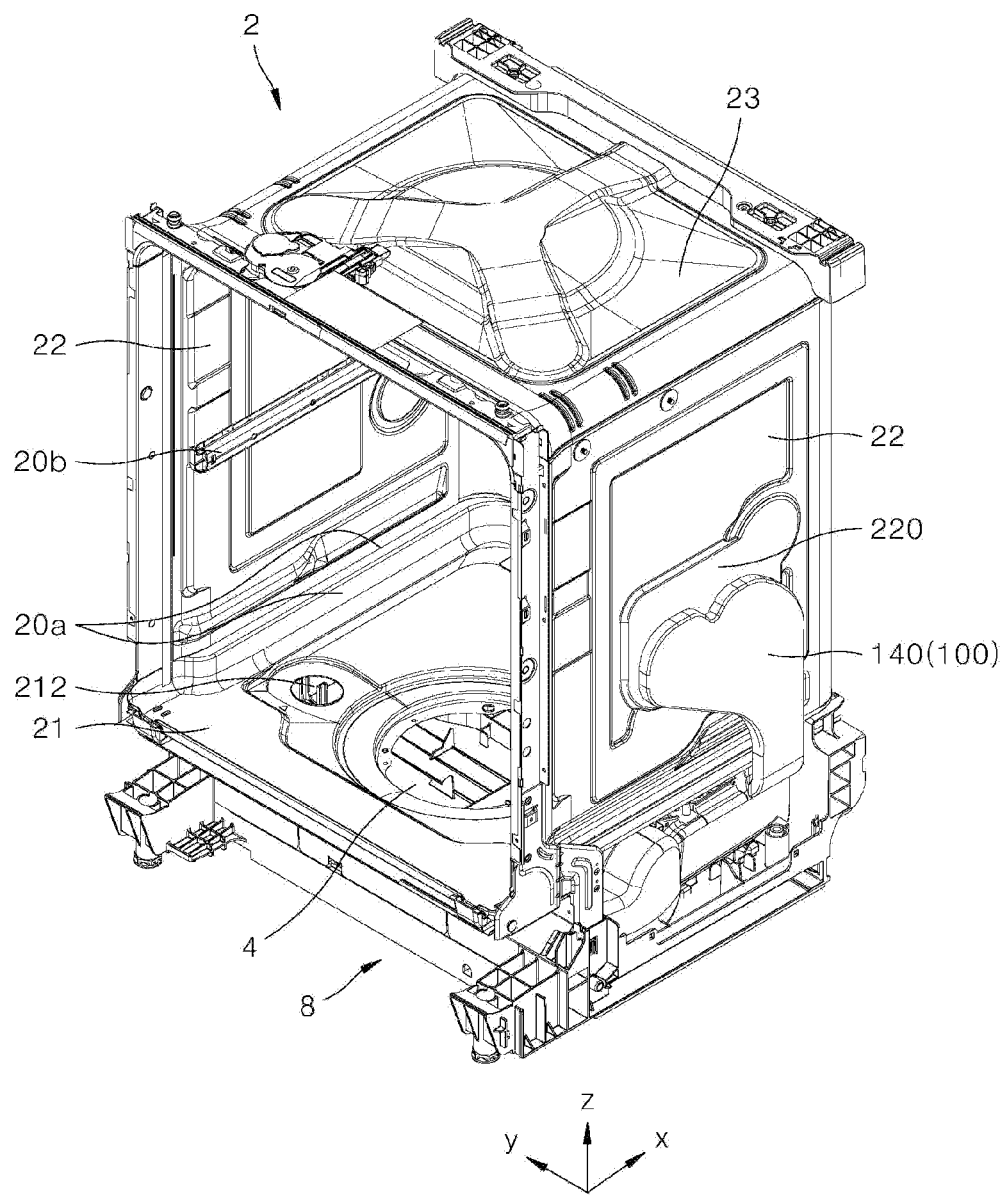
FIG. 2 is a perspective view showing an example of a coupling state of a tub and a base of the dishwasher.
Figure 3:
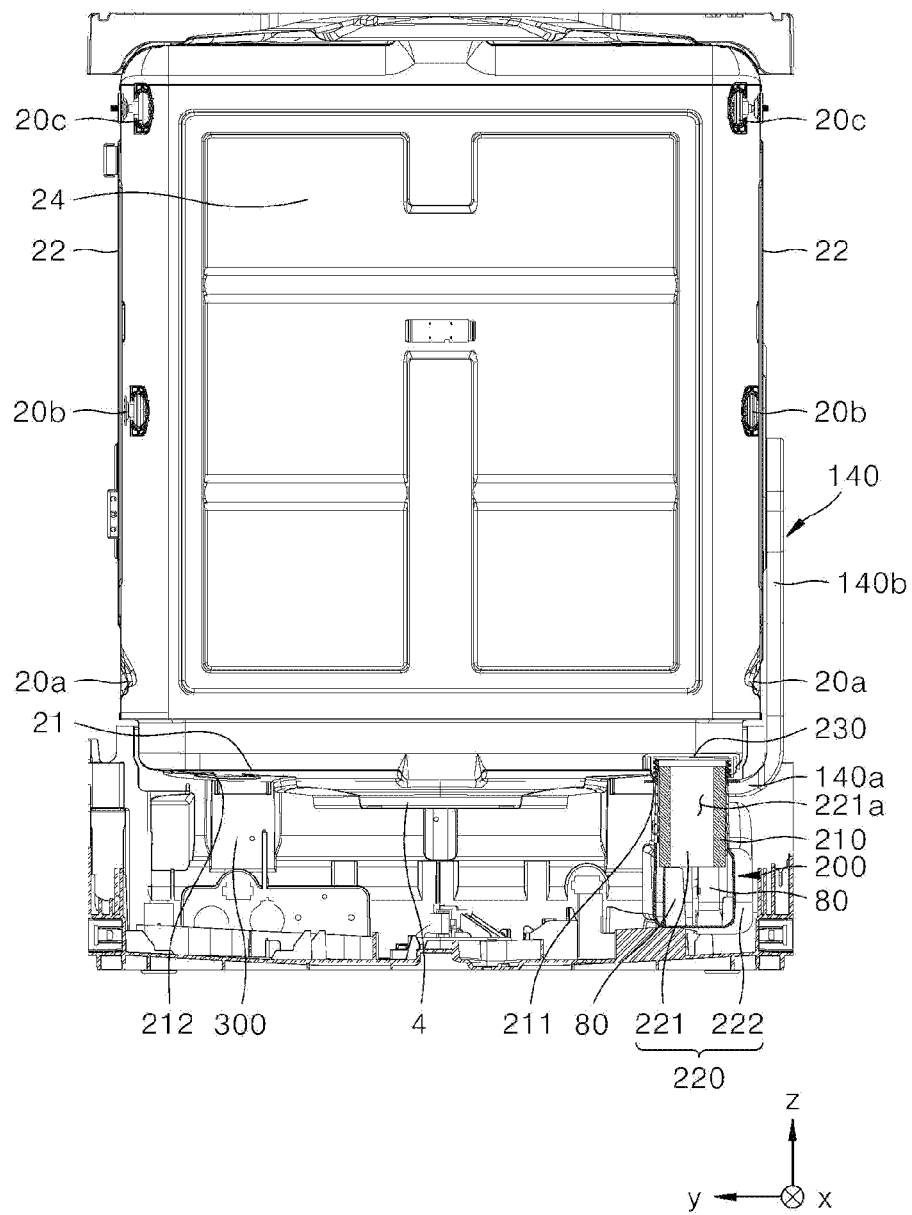
FIG. 3 is a front cross-sectional view showing the dishwasher.
Figure 4:
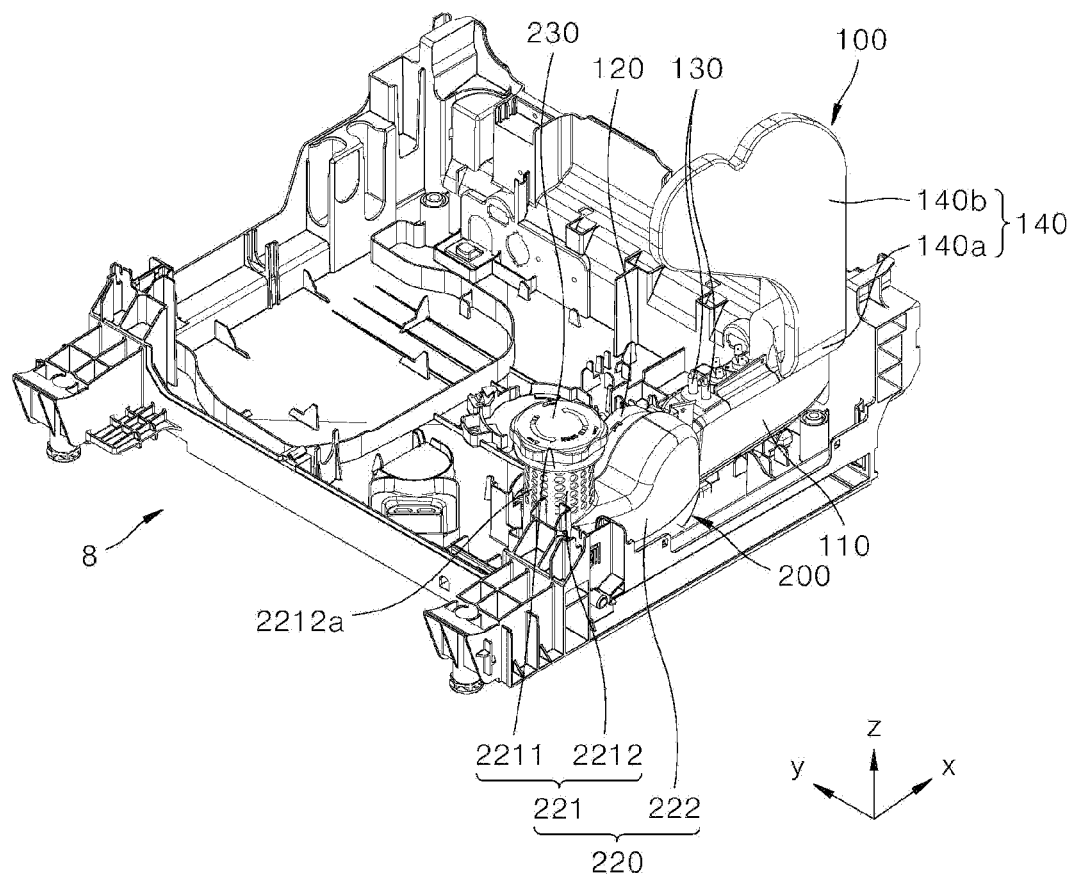
FIG. 4 is a perspective view showing a portion of the base in the dishwasher.

FIG. 2 is a perspective view showing an example of a coupling state between a tub 2 and a base 8 in the dishwasher 1. FIG. 3 is a front cross-sectional view showing the dishwasher 1. FIG. 4 is a perspective view showing the portion of the base 8 in the dishwasher 1.

In some implementations, the dishwasher 1 can further include a first filter 200 and a second filter 300.

The first filter 200 can be mounted on the base 8 and communicate with the tub 2. The first filter 200 can pass through the bottom surface of the tub 2 and communicate with the tub 2, and communicate with the air supply device 100. The first filter 200 can suction air and filter foreign substances in the air. A specific structure of the first filter 200 is described hereafter with reference to the drawings.

The second filter 300 can be mounted on the base 8, communicate with the tub 2, and connect to the water supply 43 supplying wash water. Wash water can passes through the second filter 300 through the water supply 43, flow into the tub 2, and be stored in the sump 4.

The second filter 300 can be provided as a filtering device that removes foreign substance included in the wash water flowing into the tub 2. Alternatively, the second filter 300 can also be provided as a water softening device that changes wash water from hard water to soft water.

The first filter 200 and the second filter 300 can be spaced from each other, on a bottom plate 21 of the tub 2. The sump 4 that stores wash water can be disposed between the first filter 200 and the second filter 300. That is, the first filter 200 can be disposed to be spaced from the sump 4 on one lateral direction of the tub 2, and the second filter 300 can be disposed to be spaced from the sump 4 on the other lateral direction of the tub 2.

Air and wash water flow through the first filter 200 and the second filter 300 respectively. When the first filter 200 and the second filter 300 are adjacent to each other, air and wash water may be mixed and flow into the first filter 200 and the second filter 300.

To suppress the flow of a mixture of air and wash water into both the first filter 200 and the second filter 300, the first filter 200 and the second filter 300 can be separated and spaced from each other.

The first filter 200 and the second filter 300 can be mounted on the base 8, and the sump 4 takes up a large space of the base 8. In some examples, the first filter 200 and the second filter 300 can be disposed to avoid the sump 4.

Since the base 8 is mostly occupied by the sump 4 and accommodates a pump, a PCB module and various types of devices, there is not enough space in the base 8. Accordingly, the first filter 200 and the second filter 300 can hardly be disposed in the same area of the base, except for an area of the base 8 which is taken up by the sump 4.

In the structure, when the second filter 300 is disposed at one side of the sump 4, the first filter 200 can be disposed at the other side of the sump 4, for example. For the above-mentioned reason, the sump 4 can be disposed between the first filter 200 and the second filter 300, for example.

The tub 2 can have a first penetration hole 211 on which the first filter 200 is mounted, and a second penetration hole 212 on which the second filter 300 is mounted, on the bottom surface thereof.

The first filter 200 and the second filter 300 can be in fluid communication with the tub 2. For example, the first penetration hole 211 and the second penetration hole 212 can be formed on the bottom surface, i.e., the bottom plate 21, of the tub 2. The first filter 200 can be mounted on the first penetration hole 211, and the second filter 300 can be mounted on the second penetration hole 212.

Since the sump 4 is disposed between the first filter 200 and the second filter 300, the sump 4 can be disposed between the first penetration hole 211 and the second penetration hole 212.

Figure 5:
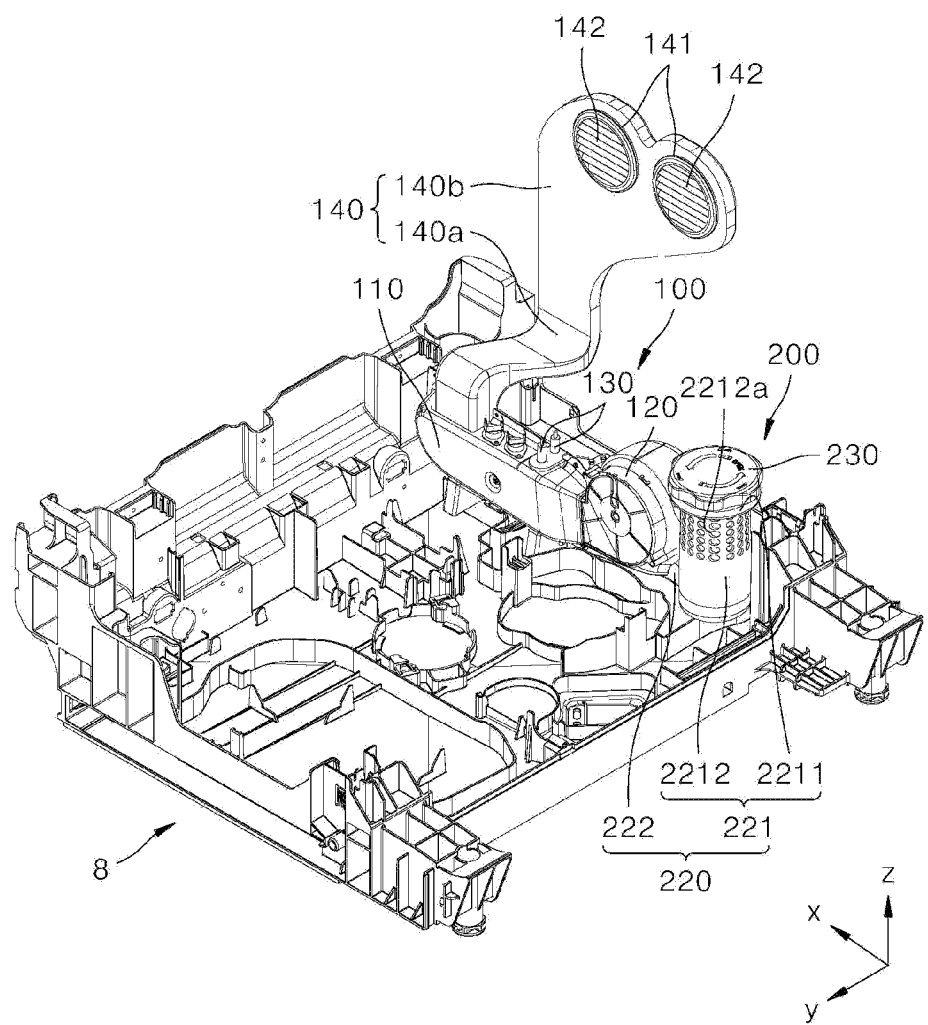
FIG. 5 is a perspective view of FIG. 4 from a different position.
Figure 6:
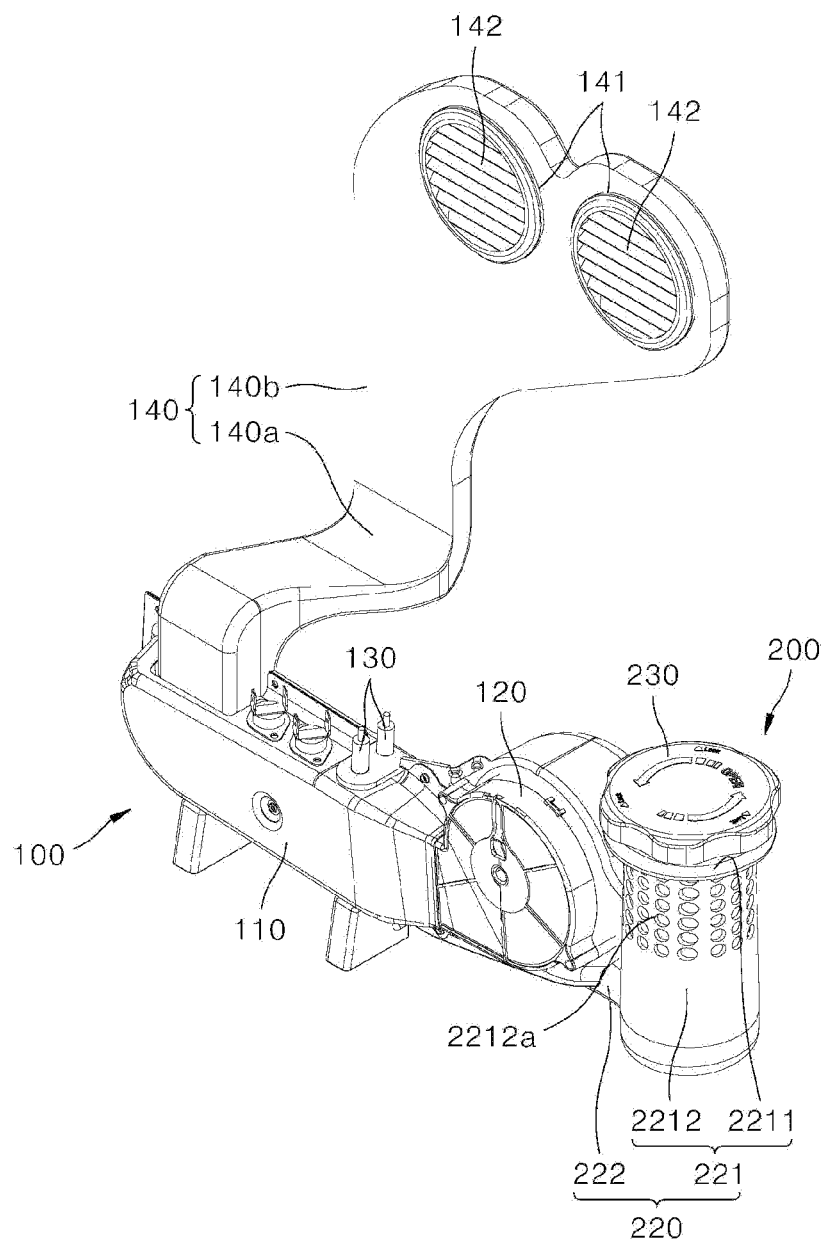
FIG. 6 is a perspective view showing an example of a hot air spray part and a filter part that are coupled.
Figure 7:
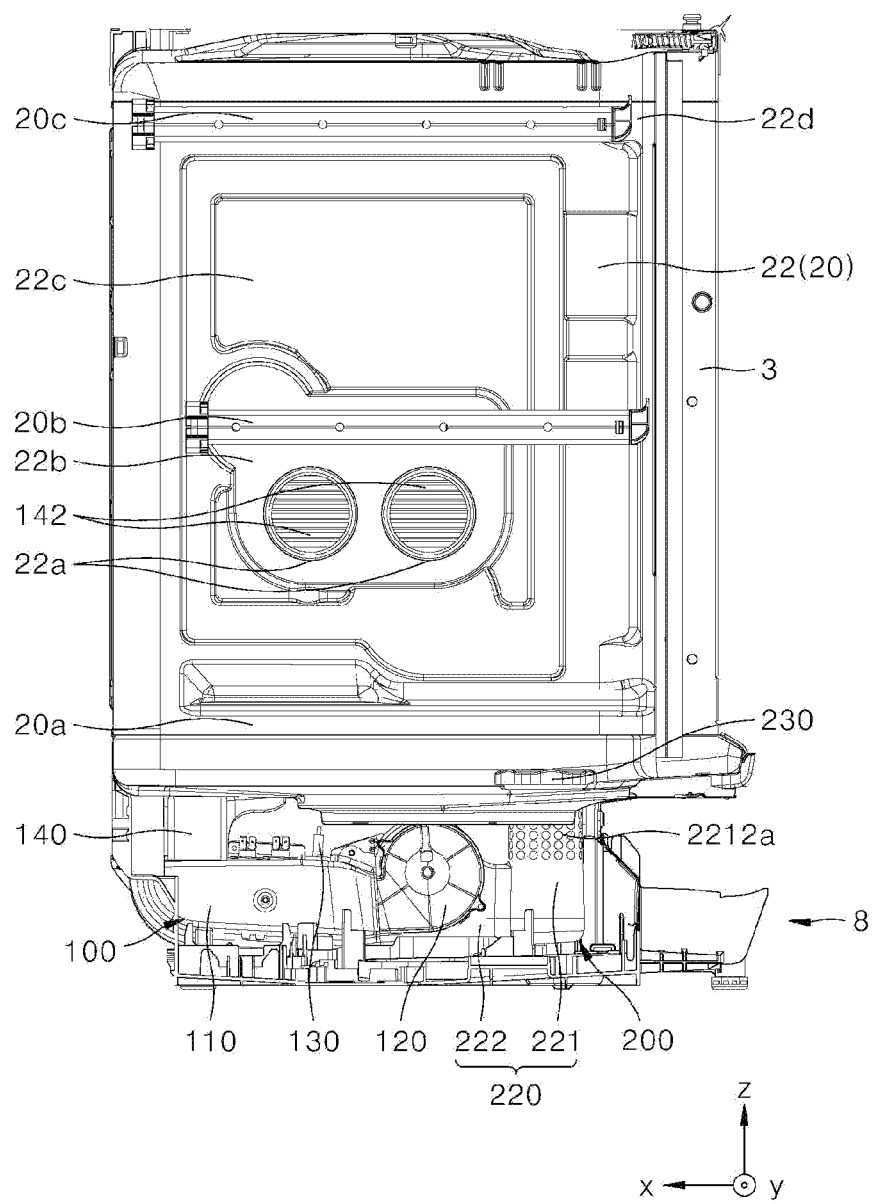
FIG. 7 is a cross-section view of FIG. 2.
Figure 8:
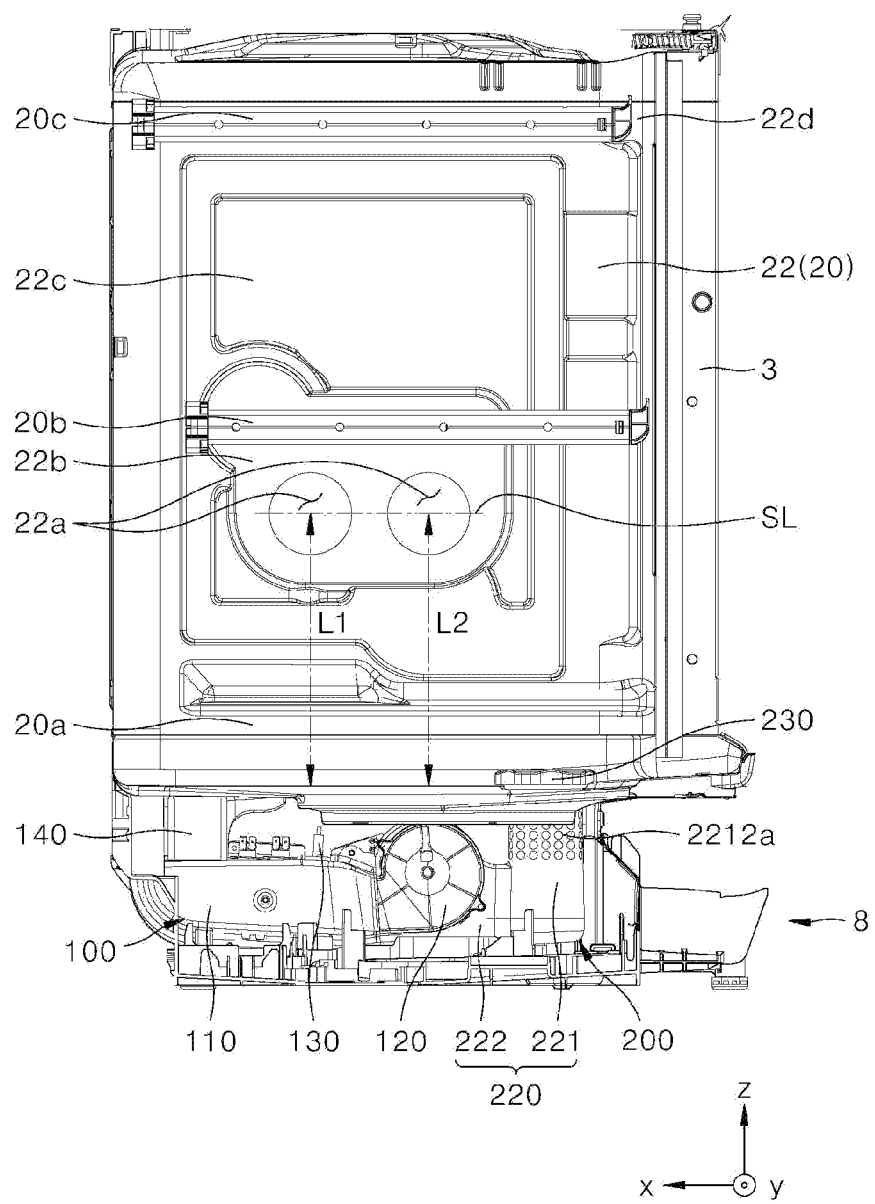
FIG. 8 is a view showing FIG. 7 without a guide vane.

FIG. 5 is a perspective view of FIG. 4 viewed from a different position. FIG. 6 is a perspective view showing an example of an air supply device 100 and a first filter 200 that are coupled. FIG. 7 is a cross-section view of FIG. 2. FIG. 8 is a view showing FIG. 7 without a guide vane 142.

The tub 2 and a holder provided in the tub 2 are described with reference to FIGS. 7 and 8.

The tub 2 can be formed into a box comprised of thin plates, and a lateral surface where the door 3 is disposed and which is opened and closed by the door 3 is open, while the remaining lateral surface is closed. The tub 2 can be formed stereoscopically based on the press or sheet metal processing. The tub 2 can include an opening 22a into which air flows from the air supply device 100, and a first forming part 22b which is depressed in the portion where the opening 22a is formed.

The tub 2 can be comprised of a bottom plate 21, a lateral plate 22, an upper plate and a rear plate 24. The bottom plate 21 can form the bottom surface of the tub 2 and have an opening communicating with the sump 4. The lateral plate 22 can be coupled to the bottom plate 21.

A pair of lateral plates 22 can be provided in a way that the lateral plates 22 bend from the bottom plate 21 and form the lateral walls of the tub 2. The lateral plates 22 can be provided with an opening 22a which communicates with a guide duct 140 and into which air flows from the guide duct 140.

The upper plate can connect the upper end portions of the lateral plates 22 to each other and form a ceiling part of the tub 2. The rear plate 24 can connect the rear end portions of the lateral plates 22 to each other and face the door 3.

A rail-type holder for holding a rack can be provided on the lateral plates 22 of the tub 2, and a pair of holders can be provided and disposed to face each other on the pair of lateral plates 22. A holder can be comprised of a first holder 20a, a second holder 20b and a third holder 20c.

The first holder 20a can be disposed in the lower portion of the tub 2, the second holder 20b can be disposed over the first holder 20, and the third holder 20c can be disposed over the second holder 20b. The first holder 20a, the second holder 20b and the third holder 20c can be spaced a proper distance from one another in the up-down direction of the tub 2.

The first holder 20a can be formed in a way that a portion of the lateral plate 22 of the tub 2 protrudes in the front-rear direction of the tub 2, and the lower rack 51 can be held in the first holder 20a. The lower rack 51 can be guided by the first holder 20a and move in the front-rear direction of the tub 2.

The second holder 20b can be formed in a way that a rail-shaped bar is coupled to the lateral plate 22 of the tub 2 so that the lengthwise direction of the rail-shaped bar can be parallel with the front-rear direction of the tub 2, and the upper rack 53 can be held in the second holder 20b. The upper rack 53 can be guided by the second holder 20b and move in the front-rear direction of the tub 2.

Likewise, the third holder 20c can be formed in a way that a bar is coupled to the lateral plate 22 of the tub 2 so that the lengthwise direction of the bar can be parallel with the front-rear direction of the tub 2, and the top rack can be held in the third holder 20c. The top rack can be guided by the third holder 20c and move in the front-rear direction of the tub 2.

Hereafter, the opening 22a is specifically described with reference to FIG. 8. The opening 22a can be formed into an approximate circle or oval, and a plurality of openings 22a can be provided. Each of the openings 22a can be spaced from each other in the front-rear direction of the tub 2. Since the plurality of openings 22a are spaced from each other, air flowing into the tub 2 through the opening 22a can be diffused into the tub 2 effectively.

The centers of the openings 22a can be disposed at the same height in the up-down direction of the tub 2. The plurality of openings 22a are disposed at the central portion of the side of the tub 2.

In FIG. 8, the plurality of openings 22a can be disposed on the lateral plate 22 of the tub 2 so that straight lines L1 and L2 from the bottom surface of the tub 2 to the centers of the two openings 22a can have the same length or a similar length in the up-down direction of the tub 2.

Additionally, a straight line connecting the centers of the plurality of openings 22a can be parallel with the front-rear direction of the tub 2. In FIG. 8, the straight line SL connecting the centers of the two openings 22a can be parallel with the front-rear direction, i.e., the x-axis direction, of the tub 2.

In the above structure, air flowing into the tub 2 from the plurality of openings 22a can be uniformly distributed and diffused to the front and rear of the tub 2.

As illustrated in FIG. 8, the openings 22a can be disposed between the first holder 20a and the second holder 20b. Since the openings 22a are disposed at a position where the openings 22a avoids the first holder 20a and the second holder 20b, air flowing through the openings 22a can be smoothly diffused into the tub 2 without be interrupted by the first holder 20a and the second holder 20b.

The openings 22a can be disposed closer to the second holder 20b than to the first holder 20a. Referring to FIG. 8, a length from the lowermost point of the upper end surface of the first holder 20a to the center of the opening 22a can be greater than a length from the lower end surface of the second holder 20b to the center of the opening 22a.

In the structure, the openings 22a can be disposed close to the central portion of the tub 2 in the up-down direction of the lateral plate 22 of the tub 2 without overlapping the upper rack 53. Accordingly, air can be diffused uniformly to the upper portion and the lower portion of the tub 2.

In some implementations, the dishwasher 1 can further include an air supply device 100. Hereafter, the air supply device 100 and the first filter 200 are specifically described with reference to the drawings.

Figure 9:
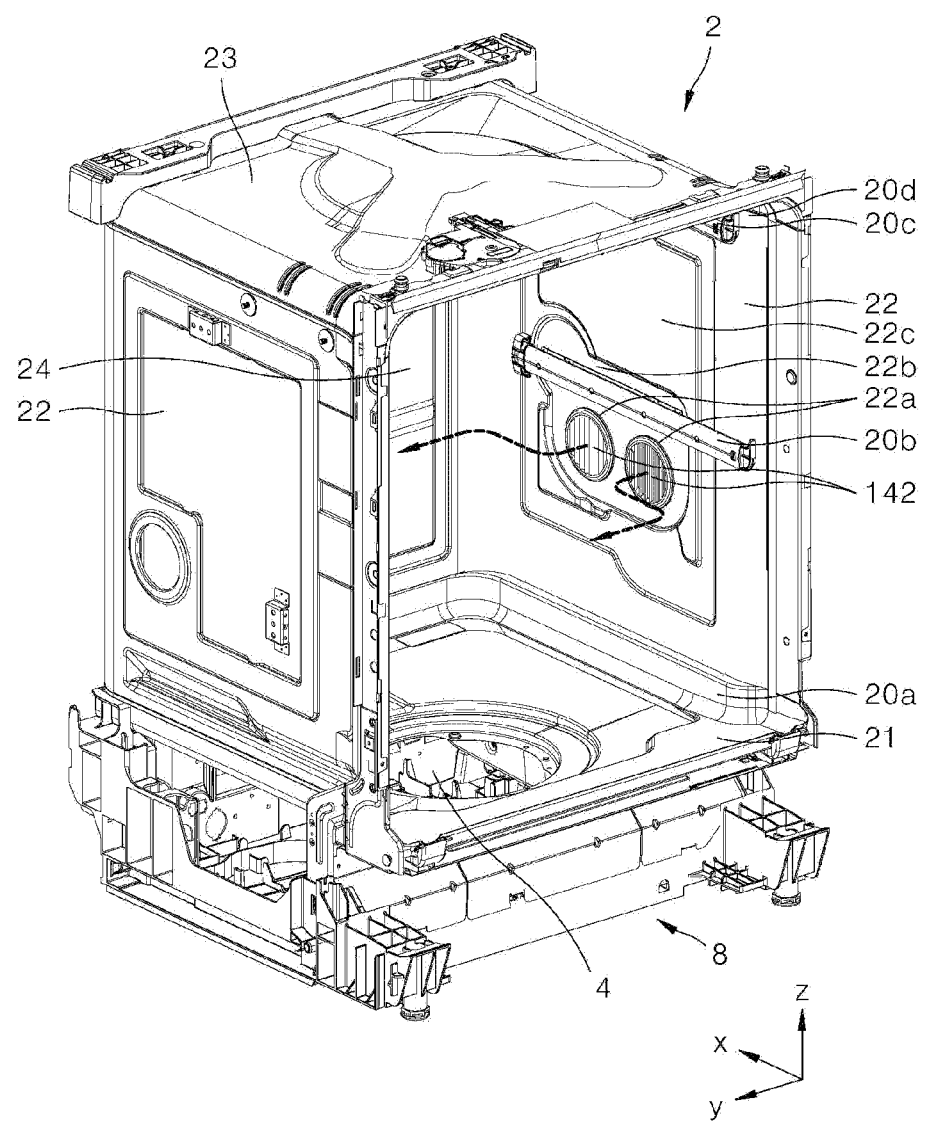
FIG. 9 is a perspective view showing the hot air spray part in the dishwasher.
Figure 10:
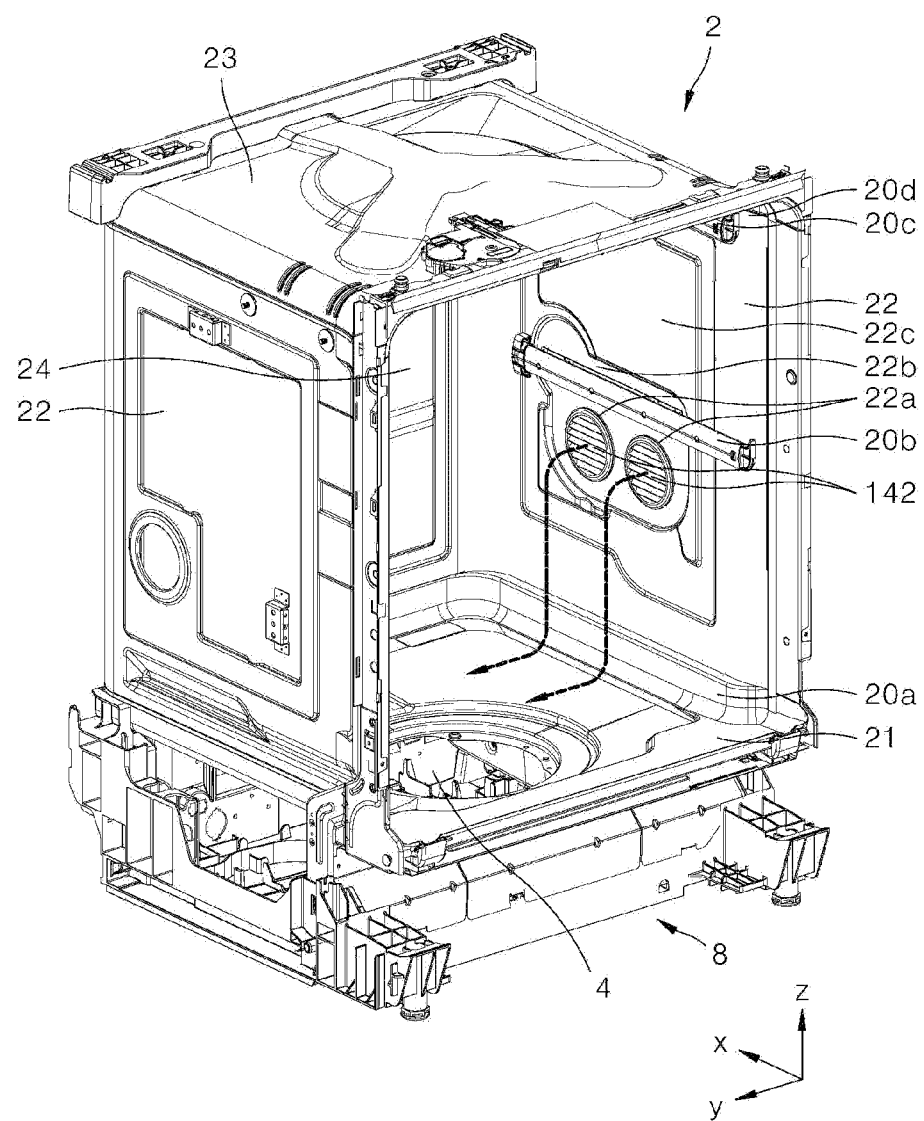
FIG. 10 is a perspective view showing an example of a hot air spray part.

FIG. 9 is a perspective view showing an example state of an air supply device 100 in the dishwasher 1. FIG. 10 is a perspective view showing an example state of an air supply device 100.

Figure 11:
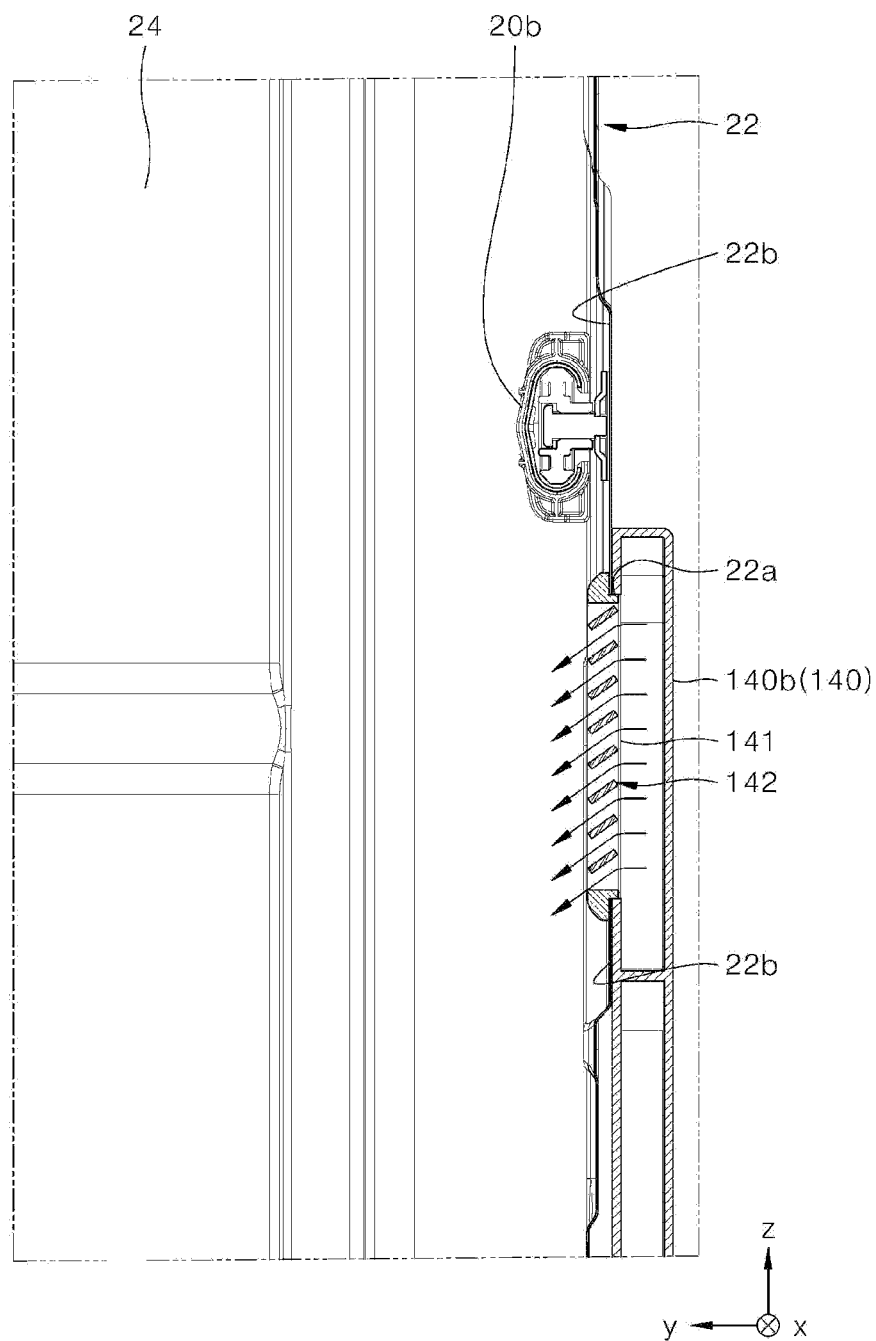
FIG. 11 is an enlarged cross-sectional view showing a portion of the dishwasher.
Figure 12:
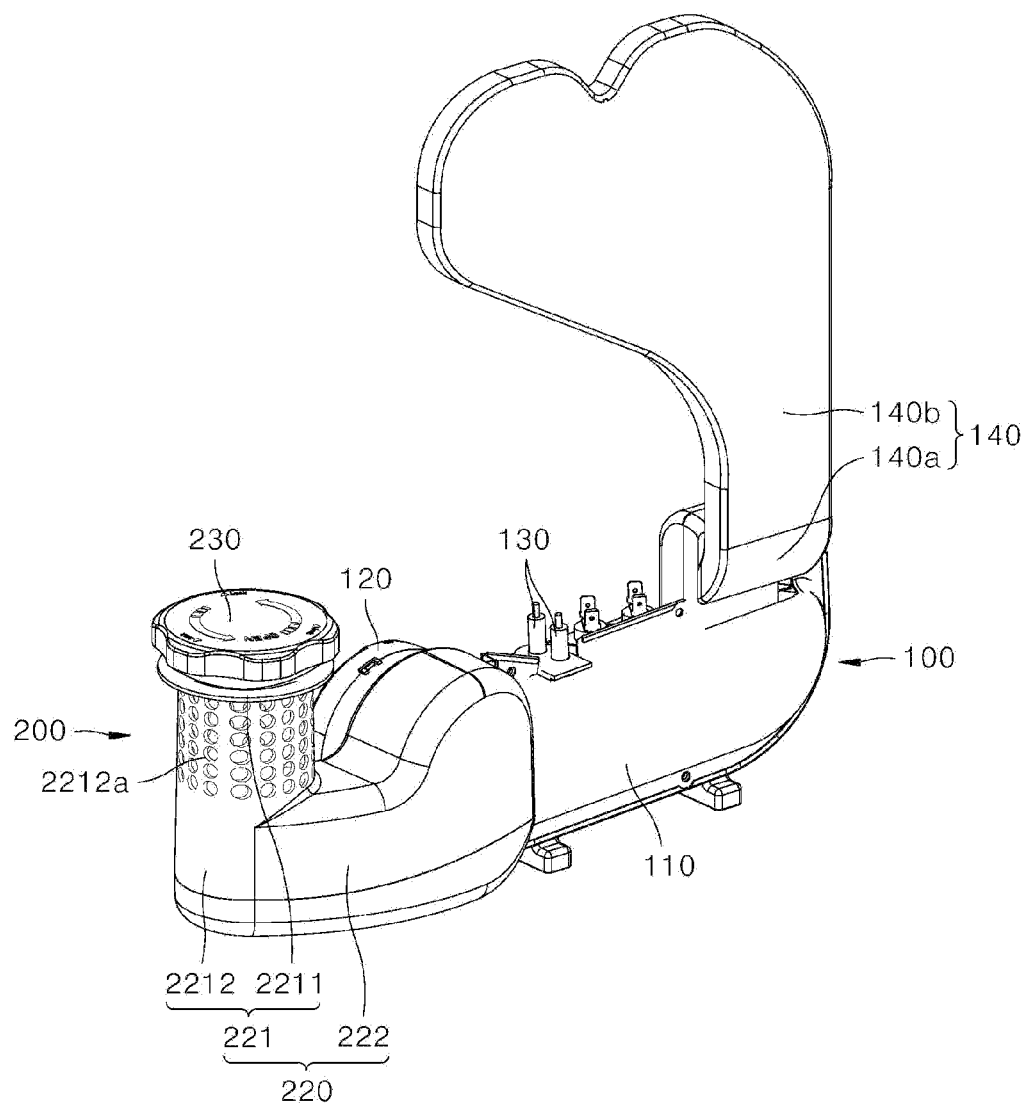
FIG. 12 is a perspective view of FIG. 6 from a different position.
Figure 13:
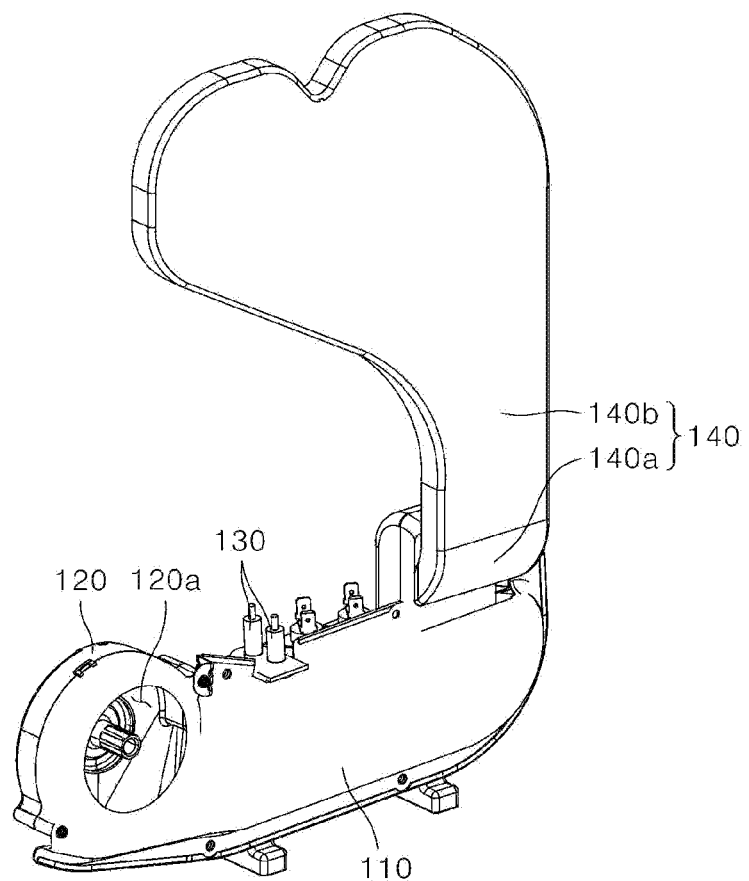
FIG. 13 is a view of FIG. 12 without a filter part.

FIG. 11 is an enlarged cross-sectional view showing an example portion of the dishwasher 1. FIG. 12 is a perspective view of FIG. 6 viewed from a different position. FIG. 13 is a view of FIG. 12 without a first filter 200.

The air supply device 100 can be mounted on the base 8, communicate with the tub 2, and spray air to the tub 2.

In some implementations, the first filter 200 and the air supply device 100 can be coupled to each other. Further, the dishwasher 1 may not be provided with the first filter 200. As illustrated in FIG. 13, the first filter 200 and the air supply device 100 can separate from each other.

In some examples, where the air supply device 100 can only be mounted on the base 8, while the first filter 200 is not, the air supply device 100 can only be mounted on the dishwasher 1, without the first filter 200.

In the case of a dishwasher without the first filter 200, it can be difficult to effectively suppress the flow of foreign substances included in air, flowing into the air supply device 100, into the air supply device 100 while the air flowing into the air supply device 100 flows smoothly.

When the dishwasher 1 is provided only with the air supply device 100, a mesh structure can be mounted on an inlet 120a of the air blowing fan 120 to prevent the flow of relatively large foreign substances or a component mounted on the base 8 into the air blowing fan 120.

Unless stated otherwise, the structure of the dishwasher 1 provided with both the first filter 200 and the air supply device 100 is described hereafter.

The air supply device 100 can spray cold air that is the flow of unheated air or hot air that is the flow of heated air. The air supply device 100 can spray cold air or hot air into the tub 2, by controlling the operation of a heater 130 disposed at the air supply device 100.

In the state in which a heating device does not operate, the air supply device 100 can spray cold air to the tub 2, and in the state in which a heating device operates, the air supply device 100 can spray hot air to the tub 2. Hereafter, the air supply device 100 spraying hot air is described.

The air supply device 100 can include a housing 110, an air blowing fan 120, a heater 130. A flow path through which air flows can be formed in the housing 110. The air blowing fan 120 can be mounted on the housing 110 and force air flowing into the air blowing fan 120 to flow.

The air blowing fan 120 can be controlled and rotated by the controller provided at the dishwasher 1. The air blowing fan 120 can be mounted on the housing 110, and an air blowing fan bracket can be formed at the housing 110. The air blowing fan bracket can have a corresponding structure to the shape of the air blowing fan 120 on which the air blowing fan 120 is rotatably mounted.

An inlet 120a of the air blowing fan 120 can be formed in the housing 110, and air can flow into the inlet 120a of the air blowing fan 120 in a parallel direction with the rotation axis of the air blowing fan 120. The inlet 120a of the air blowing fan 120 can be formed in a way that a hole is made at the air blowing fan bracket formed in the casing 220. The inlet 120a of the air blowing fan 120 can communicate with the outlet of the first filter 200, i.e., an outlet 222a of a second cell 222 described below.

At least a portion of the heater 130 can be disposed in the housing 110 and heat the air that is forced to flow by the air blowing fan 120. The heater 130 can be built into the housing 110, and the air, forced to flow by the air blowing fan 120, can be heated by the heater 130 and become hot air while flowing in the housing 110.

The heater 130, for example, can be an electric resistance heating coil, i.e., a sheath heater structure in which a coil receives electricity from a power source and heated, but not limited. The end portion of the heater 130 can be exposed to the outside of the housing 110 to electrically connect to the power source.

In the structure in which the first filter 200 and the air supply device 100 are coupled, the first filter 200 and the heater 130 can communicate with each other, and the air blowing fan 120 can be disposed between the first filter 200 and the heater 130.

The dishwasher can include a guide duct 140 in which air flows. One side of the guide duct 140 can communicate with the outlet of the housing 110, and the other side can communicate with the opening 22a of the tub 2 in a lateral portion of the tub 2. The guide duct 140 can guide the movement of hot air being discharged from the heater 130 and guide the hot air into the tub 2.

The exterior of the guide duct 140 can be entirely formed in a way that the dishwasher 1 has a narrow left-to-right width and a wide front-to-rear width, while the guide duct 140 has space, where air flows, therein. Since the guide duct 140 has the above-described exterior structure, the guide duct 140 can be mounted without difficulty on a portion between the outside of the tub 2 with little space in the left-right direction and the exterior material for the dishwasher 1.

The tub 2 can be provided with a plurality of openings 22a into which air flows from the air supply device 100. The opening 22a can be formed in a way that one side of the lateral plate 22 of the tub 2 penetrates. The opening 22a can be provided on the lateral plate 22 and communicate with the guide duct 140.

An air drying process can be performed in the state in which the door 3 is partially open. To reduce the risk caused by hot air discharged outward in the state in which the door 3 is open and imposed to the user or to prevent deterioration of the efficiency of air drying, the openings 22a can be disposed on the lateral plate 22 of the tub 2 rather than the rear plate 24 of the tub 2 or the door 3, for example.

When the openings 22a are disposed at the door 3, it is not easy to provide a flow path in which air is sent to the door 3 that moves. In this context, the openings 22a can be disposed on the lateral plate 22 of the tub 2 rather than the door 3, for example.

A plurality of openings 22a into which air flows can be provided. In FIG. 7 and the like, two openings 22a are provided, for example. In some examples, three or more openings 22a can be provided.

Since the plurality of openings 22a is provided, air can smoothly flow into the tub 2 from the air supply device 100. Additionally, since the plurality of openings 22a is provided, the direction in which air flowing into the tub 2 sprays can be adjusted to the same direction or a different direction through each opening in the portion of the opening 22a.

Further, the openings 22a can be disposed in a position where the spray of air is not interrupted such that air flows into the tub 2 smoothly, for example. Furthermore, hot air can spray closely to a large number of objects to be washed in the state in which the hot air is still hot and does not cool, for example.

For example, the openings 22a can be disposed to avoid the position where the openings 22a overlap the first holder 20a, the second holder 20b and the third holder 20c, for example. Additionally, the openings 22a can be disposed closer to the lower rack 51 and the upper rack 53 where a relatively large number of objects to be washed are placed than to the top rack, for example.

Since the openings 22a need to be disposed near the lower rack 51 and the upper rack 53, the openings 22a can be disposed on the lateral plate 22 of the tub 2 than the upper plate of the tub 2, for example.

Referring to FIG. 7, the openings 22a can be disposed between the first holder 20a on which the lower rack 51 is mounted and the second holder 20b on which the upper rack 53 is mounted. That is, the openings 22a can be defined on the lateral plate 22 of the tub 2 at a position higher than the first holder 20a and lower than the second holder 20b.

The guide duct 140 can further include a vent hole 141 and a guide vane 142. The vent hole 141 can communicate with the openings 22a such that hot air flowing from the heater 130 sprays to the tub 2, and the number of the guide ducts 140 can be the same as that of the openings 22a.

The guide vane 142 can be mounted respectively on a plurality of vent holes 141 and control a direction of the spray of air spraying to the tub 2. The guide vane 142 can be mounted in the vent hole 141, and inserted into the opening 22a and provided in a way that at least a portion of the guide vane 142 is exposed to the lateral plate 22 of the tub 2.

The guide vane 142 can have a predetermined thickness. Accordingly, at least a portion of the guide vane 142 can protrude from the inner surface of the lateral plate 22. The protruding portion of the guide vane 142 can cause a reduction in the space of the tub 2, where objects to be washed are stored, and interference with the upper rack 53 and the lower rack 51.

To solve the problem, the tub 2 of the dishwasher 1 in some examples can be provided with a first forming part 22b. The first forming part 22b can be depressed and formed in the portion where the opening 22a is formed.

The first forming part 22b can be formed in the portion where the opening 22a is formed, in a way that the inner surface of the lateral plate 22 is depressed outward. Accordingly, the first forming part 22b on the inner surface of the tub 2 can have a depressed shape, and the guide vane 142 can be disposed in the depression.

Since the guide vane 142 is disposed in the first forming part 22b, the protruding portion of the guide vane 142 can be accommodated in the first forming part 22b. Thus, the guide vane 142 may not protrude on the inner surface of the lateral plate 22 except for the first forming part 22b.

In the structure, the lower rack 51 and the upper rack 53 moving near the inner surface of the lateral plate 22 may not be interrupted by the guide vane 142, causing no reduction in the volume of the lower rack 51 and the upper rack 53 and the space where objects to be washed are stored to avoid interference.

In some implementations, since the first forming part 22b is formed and accommodates the portion of the guide vane 142, protruding from the tub 2, a reduction in the storage space of the tub 2 or the interference between the upper rack 53 and the lower rack 51, which are caused by the protruding portion of the guide vane 142, can be suppressed effectively.

The opening 22a can be formed in a way that the first forming part 22b penetrates. In this case, the first forming part 22b can have an enough surface area to include the opening 22a in the position where the opening 22a is formed.

At least a portion of the second holder 20b can be disposed in a position where the second holder 20b overlaps the first forming part 22b in the lateral direction of the tub 2 since the degree of freedom of the shape and surface area of the first forming part 22b can improve and no problem is caused by the overlapping between the second holder 20b and the first forming part 22b.

A second forming part 22c can be formed in the upper portion of the first forming part 22b, on the lateral plate 22 of the tub 2. The second forming part 22c can be formed in the upper portion of the first forming part 22b in a position where at least a portion of the second forming part 22c overlaps the upper rack 53 in a way that the inner surface of the lateral plate 22 of the tub 2 is depressed outward.

In some examples, the second forming part 22c can be formed to have a shape corresponding to the shape of the lateral surface of the upper rack 53 or to have a surface area greater than the surface area of the lateral surface of the upper rack 53. Since the second forming part 22c is formed, the volume of the upper rack 53 can increase, and more objects to be washed can be stored in the upper rack 53.

Additionally, since the second forming part 22c is formed, space can be formed between the lateral plate 22 of the tub 2 and the upper rack 53, and the space can help to reduce friction between the upper rack 53 and the lateral plate 22 when the upper rack 53 moves in the front-rear direction of the tub 2.

A third forming part 22d can be formed in the position on which the third holder 20s is mounted, on the lateral plate 22. Unlike the first forming part 22b and the second forming part 22c, the third forming part 22d can be formed in a way that the inner surface of the lateral plate 22 protrudes toward the inside of the tub 2, to mount the third holder 20c reliably.

Figure 14:
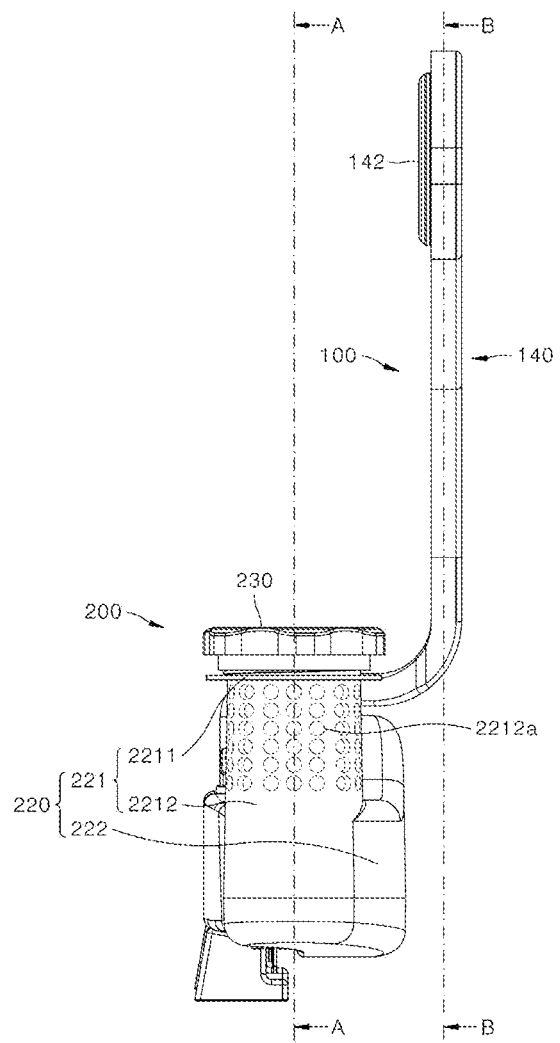
FIG. 14 is a front view of FIG. 12.
Figure 15:
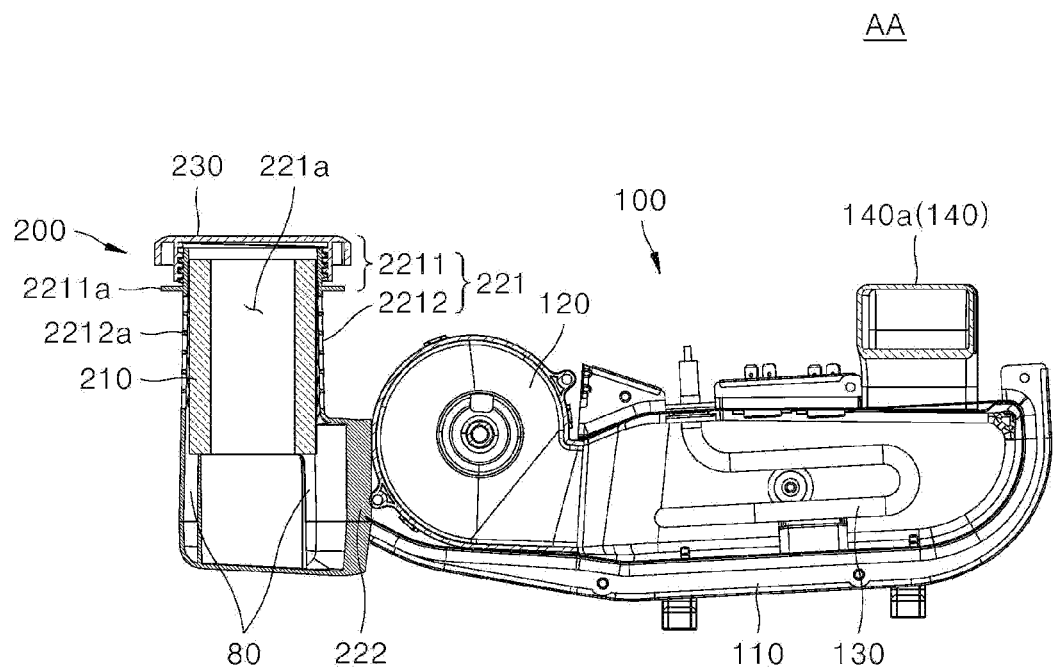
FIG. 15 is a view showing portion AA of FIG. 14.
Figure 16:
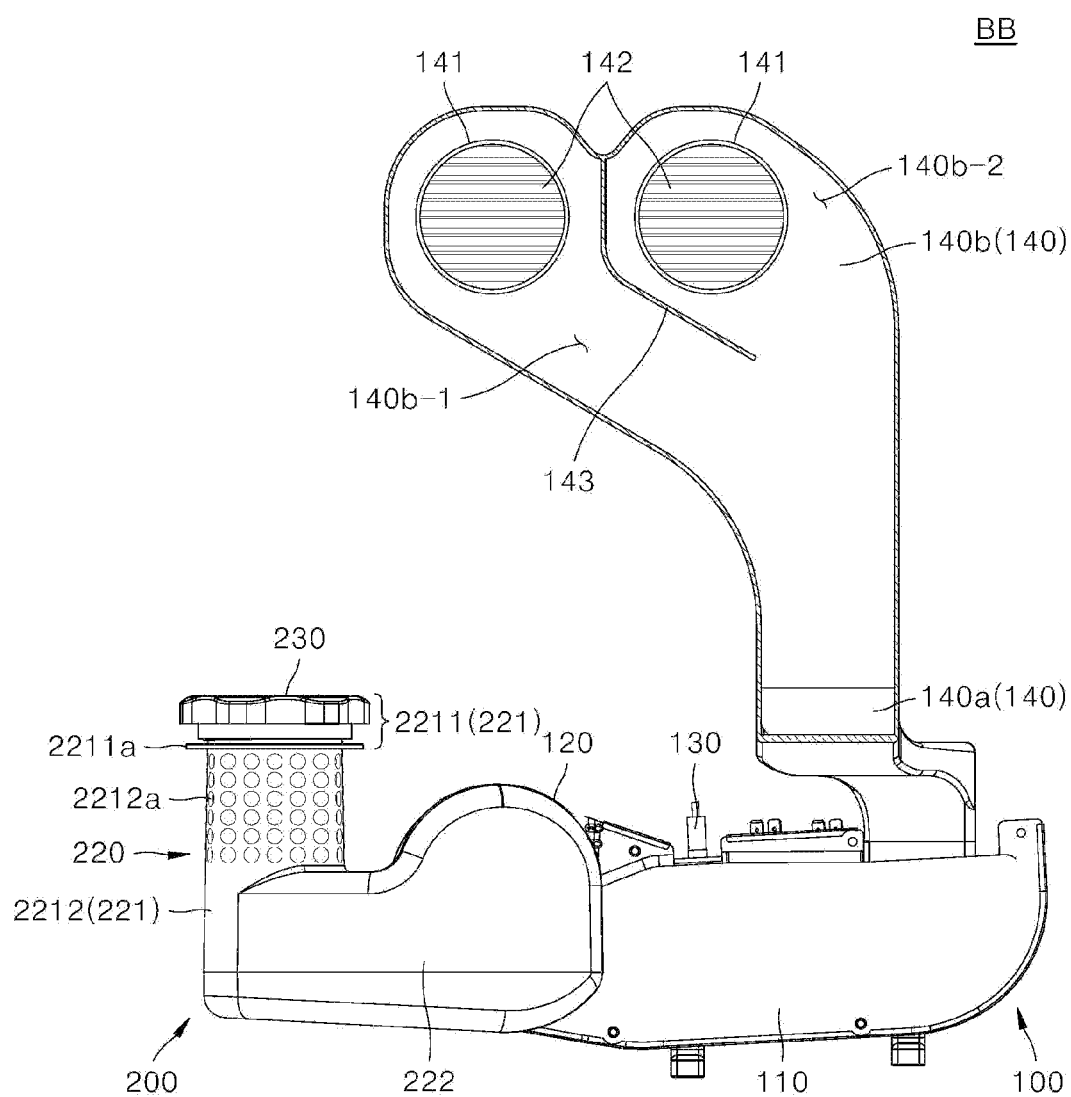
FIG. 16 is a view showing portion BB of FIG. 14.
Figure 17:
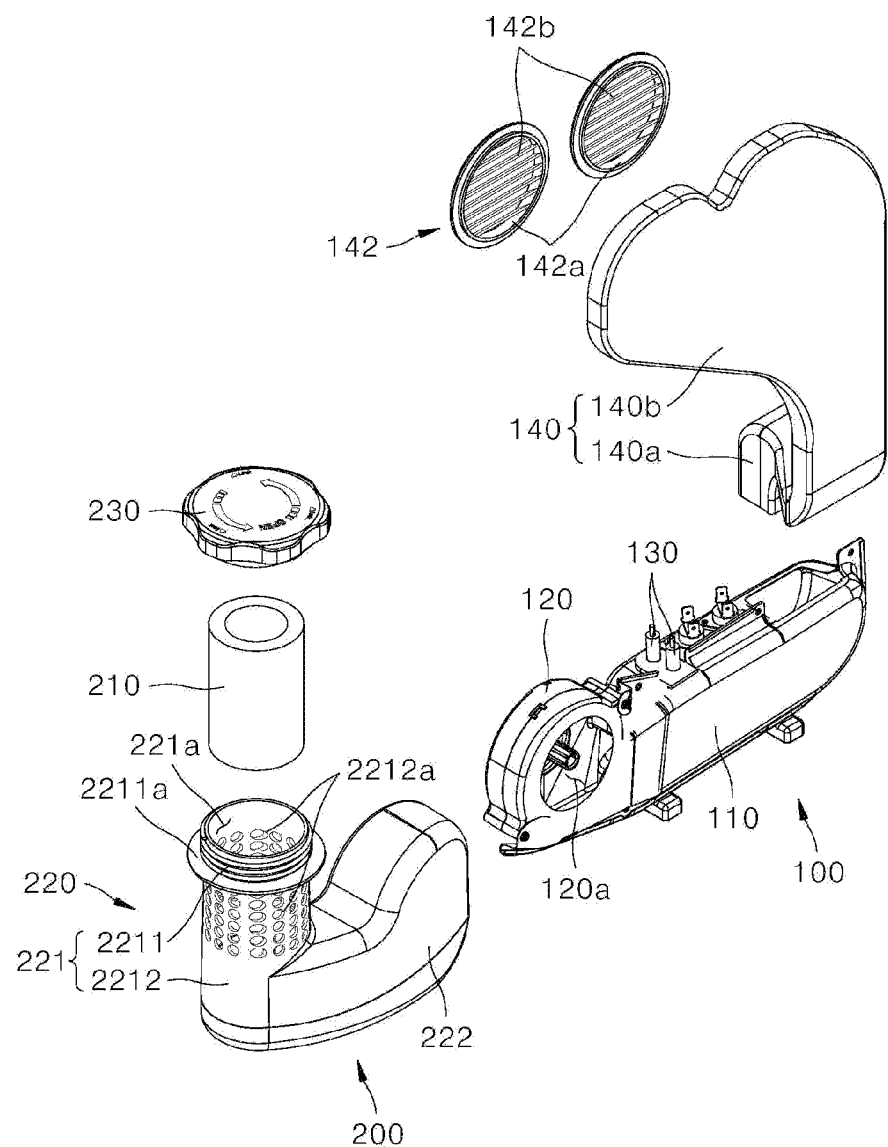
FIG. 17 is an exploded view of FIG. 12.
Figure 18:
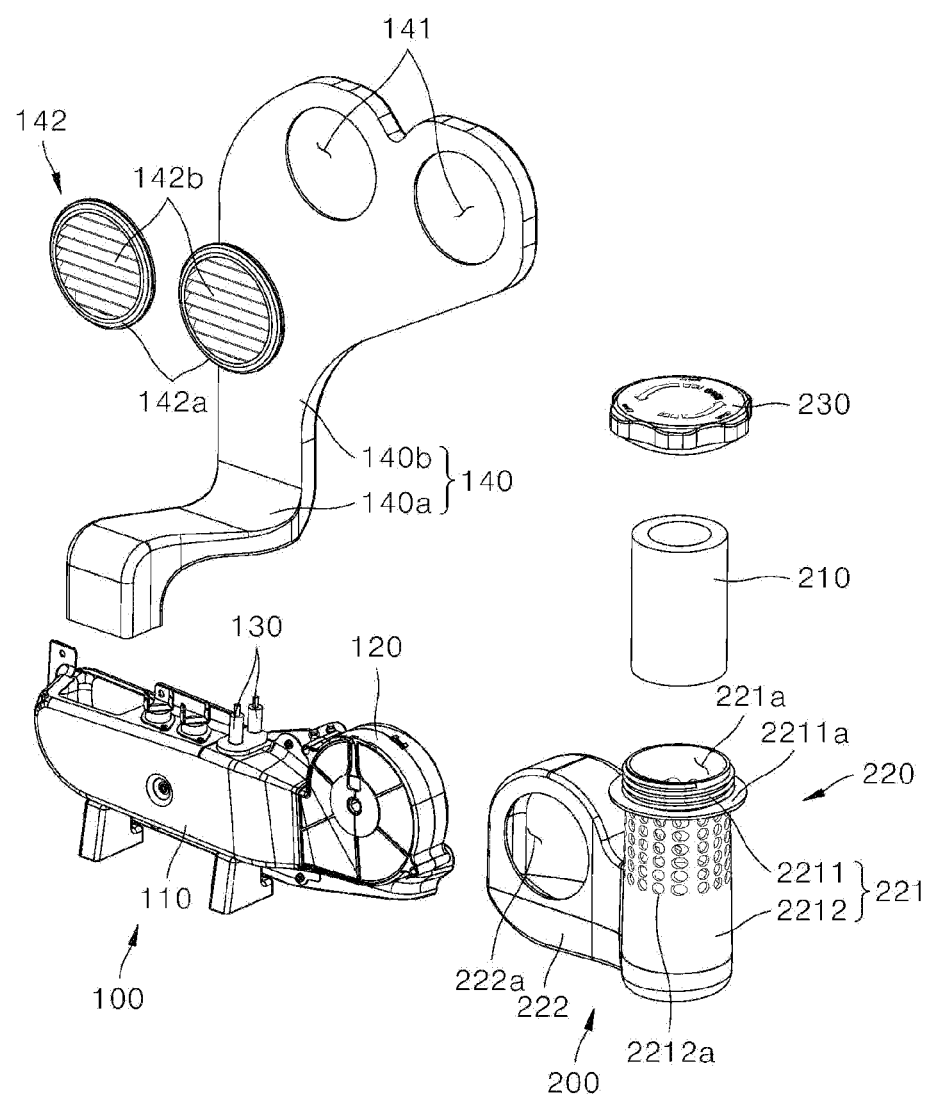
FIG. 18 is a view of FIG. 17 from a different position.

FIG. 14 is a front view of FIG. 12. FIG. 15 is a view showing portion AA of FIG. 14. FIG. 16 is a view showing portion BB of FIG. 14. FIG. 17 is an exploded view of FIG. 12. FIG. 18 is a view of FIG. 17 viewed from a different position.

As illustrated in FIG. 18, the guide vane 142 can be formed into a circle entirely to correspond to the opening 22a and the vent hole 141 that are formed into a circle. A plurality of guide vanes 142 can be provided, and each of the plurality of guide vanes 142 can be spaced from each other.

The guide vane 142 can include an edge part 142a and a wing 142b. The wing 142b can be fixed by the edge part 142a forming a circular edge, and the lengthwise direction of the guide vane 142 can be the diameter direction of the edge part 142a.

A plurality of wings 142b can be provided and spaced from each other. For example, a space between the plurality of wings 142b can define a passage through which air flows. Each wing 142b can have a length that decreases from the center of the edge part 142a toward the edge of the edge part 142a, to correspond to the shape of the circular edge part 142a.

In some examples, the wing 142b and the edge part 142a can be integrally formed. The guide vane 142 can be made of a plastic material and manufactured in injection molding, for example, but not limited.

The guide vane 142 is specifically described with reference to FIG. 11. The arrows in FIG. 11 indicate directions of the flow of air. In some examples, a plurality of guide vanes 142 and a plurality of openings 22a can be provided. For example, each of the plurality of guide vanes 142 can be mounted on each of the plurality of openings 22a to change a direction of the flow of air flowing into the openings 22a.

As illustrated in FIG. 11, a plurality of guide vanes 142 can be provided, spaced from each other, and respectively mounted on a plurality of openings 22a. The widthwise direction of the wing 142b can be at a slant with respect to a direction of the flow of air. Each of the plurality of guide vanes 142 can be mounted on each of the plurality of openings 22a and the vent hole 141. In the structure, the guide vane 142 can change a direction of the flow of air.

A direction of the flow of air flowing into the guide vane 142 can change to the width direction of the wing 142b that is disposed at a slant in the widthwise direction. In the enlarged cross-sectional view of FIG. 11, since air flowing in a direction facing the guide vane 142 can be guided by the wing 142b while passing through the wing 142b, a direction of the flow of the air changes by a predetermined angle with respect to the primary direction of the flow of the air.

Since the slant direction of the wing 142b of each guide vane 142 mounted on each of the plurality of openings 22a is adjusted, a direction of the flow of air flowing into the tub 2 can be adjusted. Accordingly, the direction of the flow of the air can vary in the tub 2.

The plurality of guide vanes 142 can change a direction of the flow of air flowing into the opening 22a such that the air sprays into the tub 2 in different directions. Description in relation to this is provided with reference to FIG. 9. The arrows in FIGS. 9 and 10 indicate directions of the flow of air.

Referring to FIG. 9, the wings 142b of two guide vanes 142 can be disposed at a slant in the front-rear direction of the tub 2. In some cases, the wings 142b of the two guide vanes 142 can be disposed at a slant respectively in the rearward and forward directions of the tub 2.

In the structure, air flowing into the tub 2 can be guided by the wing 142b of the guide vane 142. Accordingly, air flowing into one opening 22a can move from the lateral plate 22 of the tub 2 to the rear, its flow direction can be changed by the rear plate 24, and the air can move to the right of the tub 2.

Additionally, air flowing into the other opening 22a can move from the lateral plate 22 of the tub 2 to the front, its flow direction can be changed by the door 3, and the air can move to the right of the tub 2.

Since a direction of the flow of air can change in each opening 22a as described above, the direction of the flow of the air can vary, enhancing efficiency of air drying in the entire tub 2.

The plurality of guide vanes 142 can change a direction of the flow of air flowing into the opening 22a such that air sprays into the tub 2 in the same direction. Description in relation to this is provided with reference to FIG. 10.

Referring to FIG. 10, the wings 142b of two guide vanes 142 can be disposed to incline toward the lower side of the tub 2 in the same direction. In the structure, air flowing into the tub 2 can be guided by the wings 142b of the guide vanes 142, flow into the two openings 22a, and move from the lateral plate 22 of the tub 2 to the lower side, its flow direction can be changed by the bottom plate 21, and the air can move to the right of the tub 2.

When the direction of the flow of the air is the same in each opening 22a as described above, efficiency of air drying for objects to be washed being placed in a specific portion in the tub 2 can improve.

Additionally, when the direction of the flow of the air is the same in each opening 22a, air coming out of the two openings 22a can be mixed. Accordingly, vortex can be actively formed in the air, and the vortex can exert a strong impact on cooking vessels and help to improve the efficiency of air drying for the objects to be washed. In this case, since the vortex has no directionality, the objects to be washed can be affected by the air in different directions.

In some implementations, a direction of the flow of air spraying from each opening 22a can be adjusted in different directions from the above-described directions.

For example, the guide vane 142 can be detachably mounted on the opening 22a and the vent hole 141. The user can detach the guide vane 142 from the opening 22a and the vent hole 141. Accordingly, air the flow path of which is changed by the guide vane 142, or air which is not guided by the guide vane 142 and has no directionality can flow into the tub 2.

Additionally, the guide vane 142 can be mounted on the opening 22a and the vent hole 141 in a way that the guide vane 142 can rotate with respect to the lateral plate 22 of the tub 2. Accordingly, the user can rotate the plurality of guide vanes 142 to adjust a slant direction of the wings 142b of each guide vane 142, such that a direction of the flow of air can vary based on the number of cases.

In some implementations, the user can adjust a slant direction of the wings 142b of the guide vane 142 to vary a direction of air flowing into the tub 2, considering wash conditions such as the amount, sorts and arrangement positions of objects to be washed placed in the tub 2, thereby enhancing efficiency of air drying.

The guide duct 140 can be provided with a bent part 140a and an expanded part 140b. The bent part 140a and the expanded part 140b can be integrally formed in injection molding, for example.

The bent part 140a has an inlet connecting to the outlet of the housing 110, and a bent portion. The bent part 140a can be entirely bent and have a stereoscopic shape. Since the bent part 140a has a stereoscopic shape, the bent part 140a can allow the housing 110 and the opening 22a to communicate with each other even if the housing 110 and the opening 22a are spaced from each other in a three-dimensional manner.

The expanded part 140b can have an inlet that connects to the bent part 140a, and a vent hole 141 that is an outlet. The expanded part 140b can have a structure in which the surface area of the expanded part 140b increases from the inlet toward the vent hole 141. Accordingly, the expanded part 140b can have an enough surface area for a plurality of vent holes 141 having a relatively large surface area to be formed.

Referring to FIG. 16, the guide duct 140 can further include a division vane 143 that divides a flow path formed in the guide duct 140. The division vane 143 can be provided to divide at least a portion of the flow path that faces the plurality of openings 22a and is formed in the guide duct 140 that is formed in the guide duct 140 facing the plurality of openings 22a.

The division vane 143 can divide the position where each of the plurality of openings 22a is disposed, and guide air to each of the openings 22a. The division vane 143 can be formed into a partition wall in at least a portion of the expanded part 140b, and divide at least a portion of the flow path formed in the expanded part 140b into a first area 140b-1 and a second area 140b-2.

Each opening 22a can be formed in the first area 140b-1 and the second area 140b-2. Air flowing in the guide duct 140 can be guided by an edge wall of the guide duct 140 and the division vane 143 and flow, and a plurality of outlets can be formed in the portion of the plurality of openings 22a. Thus, air may not be mixed.

That is, the division vane 143 can guide air to each opening 22a, and allow air to smoothly flow in the guide duct 140. When three or more openings 22a are formed, two or more division vane 143 can be formed. That is, the number of the division vanes 143 can be one less than the number of the openings 22a.

The first filter 200 can be detachably disposed at the air supply device 100, and include an air filter 210, a casing 220, and a cap 230.

The air filter 210 can be accommodated in the casing 220 and filter foreign substances included in air. The air filter 210 can be detachably mounted on the first filter 200. The air filter 210 can filter foreign substance particles such as dust and the like included in air. The air filter 210 can be made of a porous material, and can be a high efficiency particulate air (HEPA) filter or an ultra low penetration air (ULPA) filter, for example, but not limited.

The casing 220 can provide accommodation space. The casing 220 can have one side communicating with the tub 2 and the other side communicating with the air supply device 100. The air filter 210 can be mounted on the casing 220. Referring to FIGS. 17 and 18, the air supply device 100 and the first filter 200 can be coupled each other such that the inlet 120a of the air blowing fan 120 formed at the air supply device 100 communicates with the outlet 222a of the second cell 222 of the first filter 200.

Thus, foreign substances can be removed from air by the air filter 210 while the air passes through the first filter 200, and the air flows into the air supply device 100 and then flows into the tub 2. As a consequence, air used in the process of air drying is without foreign substances and that a high level of sanitation is ensured during a process of washing cooking vessels.

The casing 220 can penetrate the bottom surface of the tub 2. The casing 220 can be disposed to penetrate the bottom surface of the tub 2 through a first penetration hole formed on the bottom plate 21 of the tub 2. Accordingly, the cap 230 can be mounted in the upper portion of the casing 220 and exposed to the lower portion of the tub 2. The cap 230 can be disposed to protrude from the bottom surface of the tub 2 to be exposed inside the tub 2. The cap 230 can be mounted on the casing 220 to replace the air filter 210 by opening and closing the casing 220 in which the air filter 210 is accommodated.

The cap 230 can be mounted on the casing 220, and open and close the first penetration hole 211 formed on the bottom surface of the tub 2. The cap 230 can be detachably disposed at the casing 220, mounted on the casing 220, and close a portion that the casing 220 communicate with the tub 2. The cap 230 can be screw-coupled to the casing 220, and the user can rotate the cap 230 to mount the cap 230 on the casing 220 or to detach the cap 230 from the casing 220.

The casing 220 can have one side communicating with the tub 2 and the other side communicating with the air supply device 100, and include a first cell 221 and a second cell 222. For example, the first cell 221 and the second cell 222 can be integrally manufactured in injection molding and the like.

The first cell 221 can have a first communication hole 221a which communicates with the tub 2 and on which the cap 230 is mounted. The second cell 222 can have one side communicating with the first communication hole 221a, and the other side communicating with the air supply device 100. As described above, the outlet 222a of the second cell 222 can communicate with the inlet 120a of the air blowing fan 120.

The first cell 221 can be formed into a cylinder having a hollow hole, and include a first coupling part 2211 and a second coupling part. The first coupling part 2211 and the second coupling part can be integrally formed, for example. The first coupling part 2211 can have a screw thread that is formed in the upper portion of first coupling part 2211, disposed in the first penetration hole 211 formed on the bottom surface of the tub 2, and screw-coupled to the cap 230.

The casing 220 can include a stopper 2211a that protrudes from the surface of the casing 220 and limits a range of the downward movement, i.e., the z-axis movement, of the cap 230. The stopper 2211a can be disposed at the first coupling part 2211.

The stopper 2211a may have a ring shape and protrude radially outward. The stopper 2211a may protrude radially outward from a boundary between the first coupling part 2211 and the air suction part 2212 described below.

The first coupling part 2211 can be provided with the stopper 2211a that protrudes outward from its lower end, i.e., the portion where the first coupling part 2211 is coupled to an air suction part 2212, in the diameter direction, and is formed into a ring. The stopper 2211a can stop the lower end of the cap 230 from moving downward from the stopper 2211a.

The air suction part 2212 can be disposed under the first coupling part 2211, and have a plurality of air suction holes 2212a communicating with the base 8. A plurality of air suction holes 2212a can be arranged in the circumferential direction and the lengthwise direction of the first coupling part 2211.

The air filter 210 can be formed into a cylinder having a hollow hole to be mounted in the hollow hole of the first cell 221. The air filter 210 can be mounted on the inner circumferential surface of the first cell 221 to close the air suction hole 2212a.

Air can be suctioned from the outer circumference of the air suction part 2212 into the air suction part 2212, pass through the air filter 210, move in the diameter direction of the air filter 210 toward the center of the air filter 210, and the move down to the lower portion of the air filter 210. Thus, external air can be suctioned in the radial direction of the air filter 210 toward the center of the air filter 210 through the air suction part 2212, and air suctioned in through the air suction part 2212 may descend to a lower part of the air filter 210 and may be supplied to the air supply device 100.

The air having moved to the lower portion of the air filter 210 can flow into the air blowing fan 120 of the air supply device 100, and finally, spray to the tub 2. As the air blowing fan 120 operates, air can flow into the air suction hole 2212a from the space of the base 8, and the air having flown into the air suction hole 2212a can be filtered by the air filter 210, and foreign substances such as dust and the like can be filtered.

When the cap 230 is detached from the first coupling part 2211 of the casing 220, at least a portion of the casing 220 can be exposed to the bottom surface of the tub 2. As the cap 230 is detached, the air filter 210 can also be exposed to the bottom surface of the tub 2. Accordingly, the user can approach the air filter 210 easily. The user can detach the air filter 210 exposed to the bottom surface of the tub 2 easily from the first filter 200 or mount the air filter 210 in the first filter 200, after detaching the cap 230.

When the dishwasher 1 continues to be used, the air filter 210 can be contaminated by foreign substances such as dust and the like. Accordingly, the air filter 210 can be washed or replaced with a new one on a regular basis.

In some implementations, the user can detach the air filter 210 from the first filter 200 and mount the air filter 210 in the first filter 200 as follows. The user can rotate the cap 230 and detach the cap 230 from the first filter 200. As the cap 230 is detached, the air filter 210 can be exposed to the bottom surface of the tub 2 at least partially. Accordingly, the user can pick up the air filter 210 and detach the air filter 210 from the first filter 200.

The user can mount the detached air filter 210 that is washed or a new air filter 210 in the first communication hole 221a formed in the first cell 221 of the first filter 200. Then the user can fit the cap 230 into the first coupling part 2211 of the first cell 221, rotate the cap 230, and close the first communication hole 221a to mount the air filter 210 in the first filter 200 again.

Referring to FIG. 15, the first cell 221 can have a filter guide 80 on which the air filter 210 is mounted, in a portion of the lower portion thereof, which corresponds to the first communication hole 221a. The filter guide 80 can be disposed in the lower portion of the first communication hole 221a and support the air filter 210 disposed in the upper portion of the first communication hole 221a.

The filter guide 80 can be formed into a rib that protrudes upward in the first cell 221. When the air filter 210 is mounted in the first cell 221, the filter guide 80 can guide the air filter 210 such that the air filter 210 sits in a position where the air filter 210 can filters air flowing into the first cell 221, and suppress the movement of the air filter 210 in the first cell 221, thereby supporting the air filter 210 reliably.

Additionally, the height of the upper surface of the filter guide 80 can be properly determined such that the user picks up the air filter 210 mounted in the first communication hole 221a to replace the air filter 210 easily.

In some implementations, since the first filter 200 which is coupled to the air supply device 100 and in which the air filter 210 is mounted is provided, the air filter 210 filters foreign substance such as dust and the like included in air and help to improve the sanitation level of the dishwasher 1.

Figure 19:
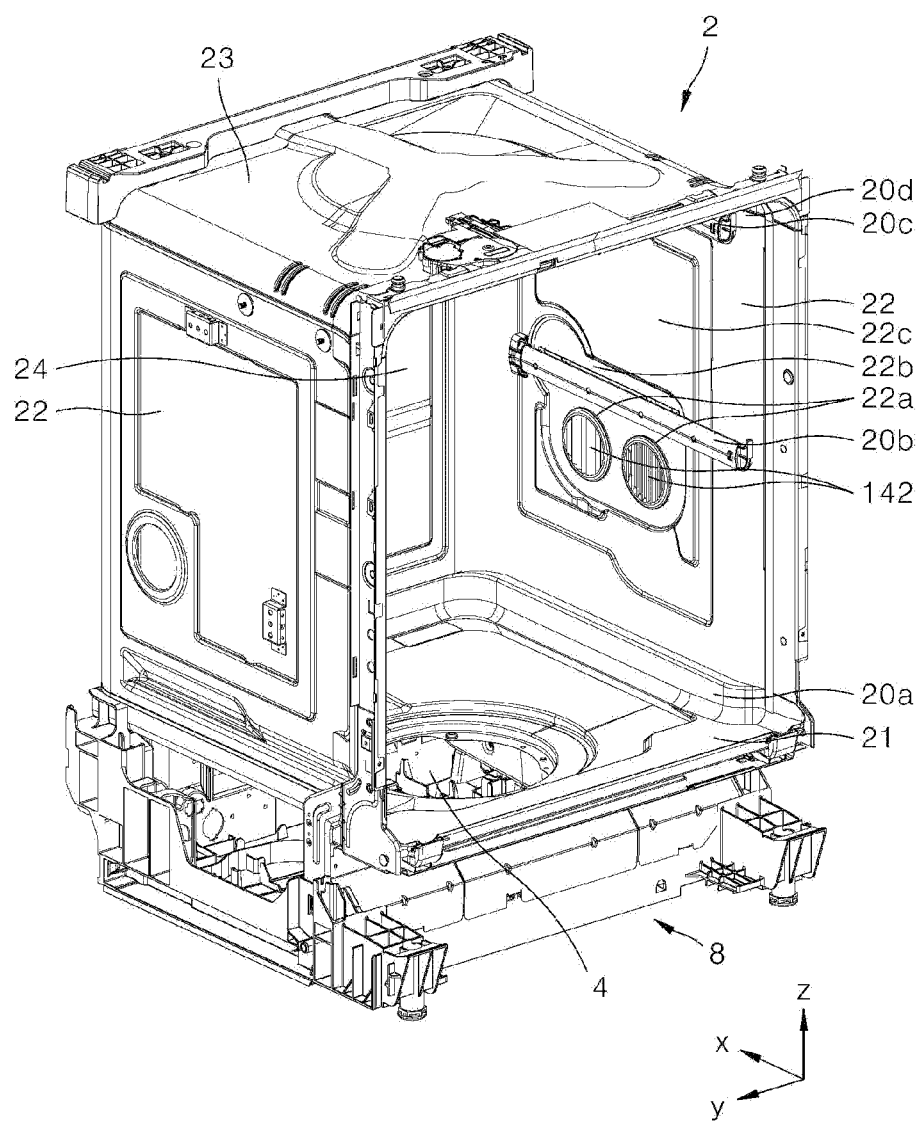
FIG. 19 is a perspective view showing an example of an inside of the tub.
Figure 20:
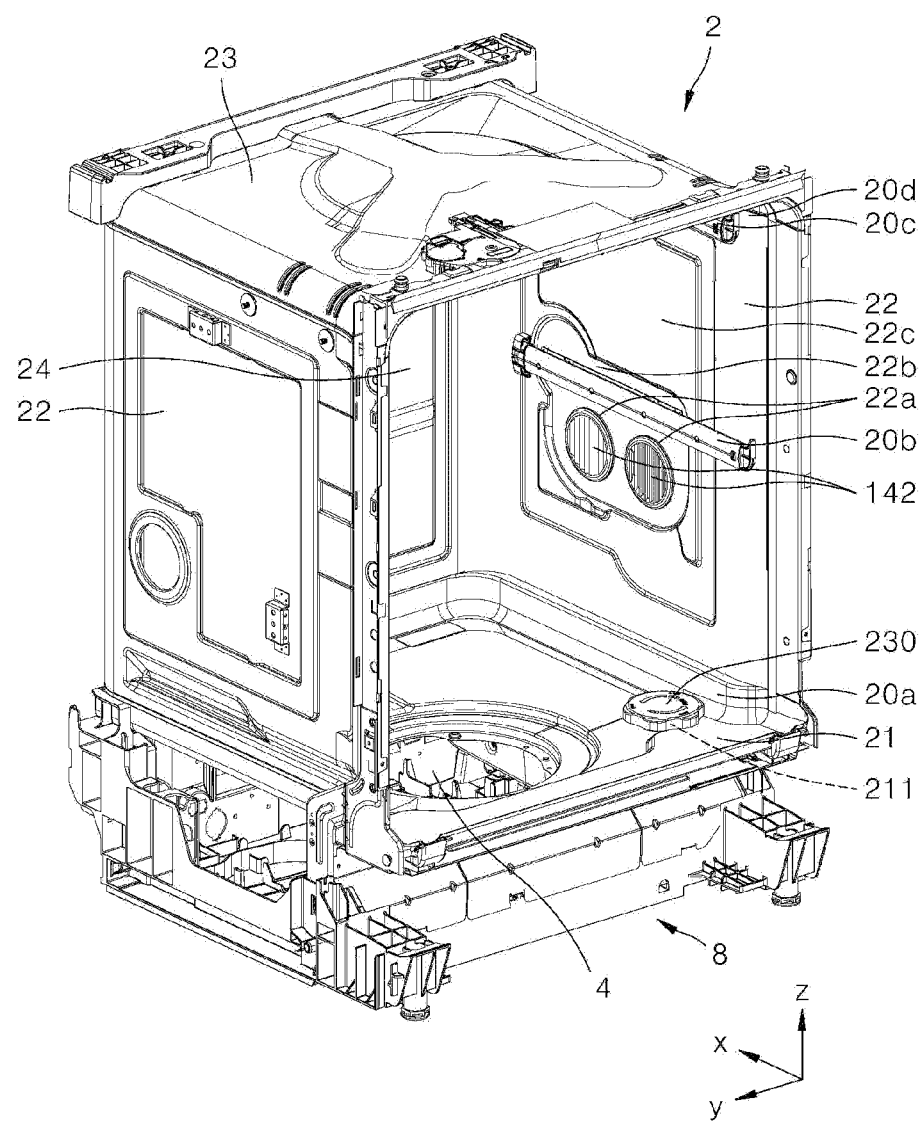
FIG. 20 is a perspective view showing an example of an inside of a tub.

FIG. 19 is a perspective view showing an example of an inside of the tub 2. FIG. 20 is a perspective view showing an example of ab inside of a tub 2. As described above, the dishwasher 1 can be provided only with the air supply device 100 or both of the air supply device 100 and the first filter 200.

FIG. 19 shows a tub 2 of the dishwasher 1, which is provide only with the air supply device 100 but for the first filter 200. In some cases, since the first filter 200 is not provided, a structure for detaching and mounting the air filter 210 may not be included. Accordingly, a structure in relation to the first filter 200 may not be provided on the bottom plate 21 of the tub 2.

FIG. 20 shows a tub 2 of the dishwasher 1, which is provided with both the air supply device 100 and the first filter 200. In this case, a structure for enabling the user to detach and mount the air filter 210 readily can be provided.

For example, the first penetration hole 211 can be formed on the bottom plate 21 of the tub 2, and the first cell 221 of the first filter 200 and the cap 230 coupled to the first cell 221 can be disposed at the first penetration hole 211.

The positions where the first cell 221 and the cap 230 are disposed can be taken into account. There is not enough space for mounting the first filter 200 and the air supply device 100 in portions adjacent to the lateral plates 22, the rear plate 24 and the upper plate of the tub 2. The base 8 is disposed below the bottom plate 21 of the tub 2, and enough space for mounting the casing 220 of the first filter 200 and the housing 110 of the air supply device 100 can be ensured in the base 8.

Additionally, the bottom plate 21 of the tub 2 can be easily approached by the user. The user can easily detach the lower rack 51 from the tub 2, and as the lower rack 51 is detached, the user can easily approach the bottom plate 21.

Further, the user can see the bottom plate 21 easily when looking down. Accordingly, when replacing the air filter 210, the user can easily find the first cell 221 in which the air filter 210 is mounted, and the cap 230 coupled to the first cell 221, and have a comfortable posture and look at the air filter 210 while replacing the air filter 210.

For the above reasons, the cap 230 and the first cell 221 can be disposed in the portion of the bottom plate 21, and the first penetration hole 211 can also be formed on the bottom plate 21, for example.

Figure 21:
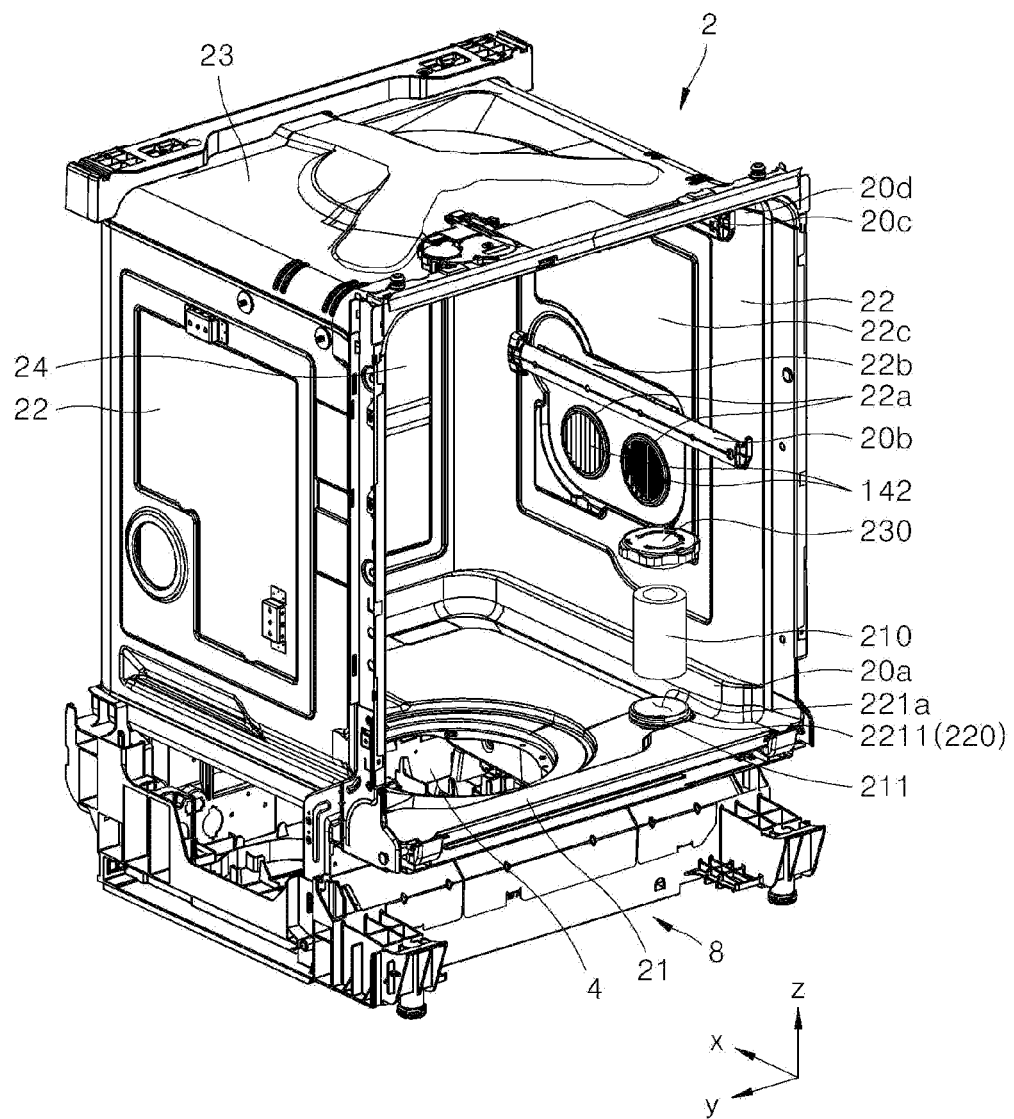
FIG. 21 is a view showing example components of the filter part in FIG. 20 that are dissembled.

FIG. 21 is a view showing example components of the first filter 200 in FIG. 20 that are dissembled. As described above, the first filter 200 can be disposed under the bottom plate 21 of the tub 2, and the first penetration hole 211, in which the first cell 221 and the cap 230 are disposed, is formed on the bottom plate 21 of the tub 2, for example, for user convenience.

Hereafter, a position relationship between the opening 22a formed on the lateral plate 22 of the tub 2, and the portion where the first filter 200 penetrates the bottom plate 21 and is disposed on the bottom plate 21, i.e., the first penetration hole 211 formed on the bottom plate 21 of the tub 2, is taken into account. The position of the first penetration hole 211 corresponds to the position of the first cell 221 of the first filter 200. Accordingly the position relationship between the opening 22a and the first penetration hole 211 can be withdrawn based on the position relationship between the opening 22a and the first cell 221.

Air used for air drying can flow into the first cell 221 of the first filter 200, be heated while flowing in the air supply device 100, pass through the guide duct 140 of the air supply device 100 and spray to the tub 2 through the opening 22a.

The length and shape of the bent part 140a of the guide duct 140 can be adjusted based on the arrangement position and a distance between the first cell 221 and the opening 22a, to allow the first cell 221 and the opening 22a to communicate with each other. As the distance between the first cell 221 and the opening 22a increases, the first cell 221 and the opening 22a can hardly communicate with each other.

The sump 4 storing wash water can be provided at the center of the bottom plate 21. The sump 4 can occupy large space on the bottom plate 21, and it is difficult to dispose pipes and components in a portion of the bottom plate 21, where the sump 4 is disposed, below the bottom plate 21.

If the opening 22a is far from the first cell 221 with respect to the center of the bottom plate 21, the bent part 140a is disposed to avoid the sump 4 occupying the center of the bottom plate 21 across the bottom plate 21.

In some cases, the bent part 140a forming a flow path of air may have a complex shape, making it difficult to design the dishwasher 1 as a whole. To simply design the shape of the bent part 140a, the opening 22a and the first cell 221 can be disposed close to each other with respect to the center of the bottom plate 21, i.e., in the same area, for example.

Since the first cell 221 and the first penetration hole 211 are disposed in the same position, the first penetration hole 211 and the opening 22a can be disposed in the same area with respect to the center of the bottom plate 21, for example.

When the tub 2 is divided in a parallel direction with the direction where the lateral plate 22 is disposed, with respect to the center of the bottom plate 21 of the tub 2, the opening 22a, and the portion where the first filter 200 penetrates the bottom plate 21 and is disposed on the bottom plate 21, i.e., the first penetration hole 211, can be disposed in the same area, for example.

Figure 22:
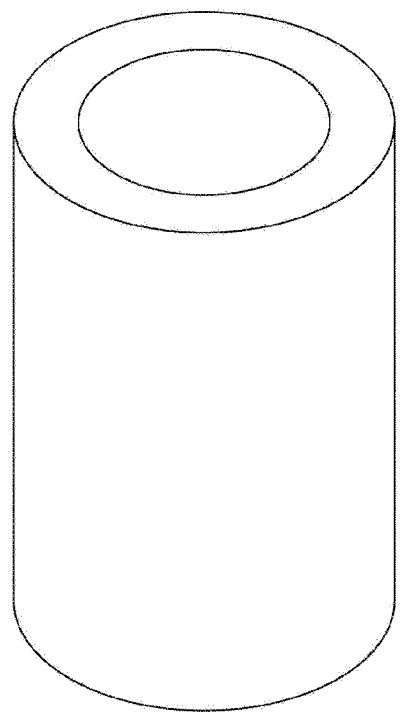
FIG. 22 is a perspective view showing an example of an air filter.
Figure 23:
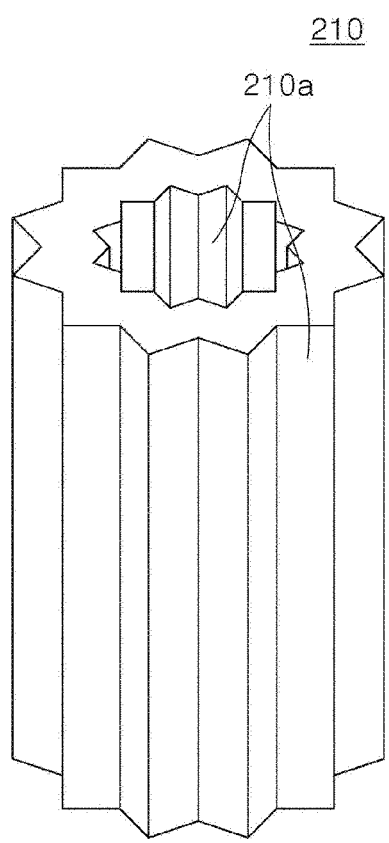
FIG. 23 is a perspective view showing an example of an air filter.

FIG. 22 is a perspective view showing an air filter 210. FIG. 23 is a perspective view showing an example of an air filter 210.

In some implementations, referring to FIG. 22, the air filter 210 can be formed into a cylinder having a hollow hole. The thickness of the air filter 210, i.e., a distance between the outer circumferential surface and the inner circumferential surface of the air filter 210, can be properly determined based on a material for the air filter 210.

Referring to FIG. 23, the air filter 210 can be formed into a cylinder having a hollow hole, and can be formed in a way that a concave and convex part 210a is formed in the circumferential direction on at least any one of the inner circumference and the outer circumference of the air filter 210.

The inner circumference and the outer circumference of the filter can be surfaces through which air passes. Since the concave and convex part 210a is formed on the inner circumference and/or the outer circumference of the air filter 210, the surface area of the air filter 210, through which air passes, expands, thereby enhancing the air filter 210's effect of filtering foreign substances.

In some implementations, the first filter 200 can be disposed in a position easily approached by the user, and the user can easily detach and mount the air filter 210, providing convenience of washing or replacing the air filter 210.

Since a distance between the first filter 200, and the opening 22a formed on the lateral plate 22 of the tub 2 is minimized, a flow path of air from the first filter 200 to the opening 22a can be simplified, thereby improving volumetric efficiency of the dishwasher 1 and ensuring a simple structure of the dishwasher 1.

The implementations are described above with reference to a number of illustrative implementations thereof. However, implementations are not limited to the implementations and drawings set forth herein, and numerous other modifications and implementations can be devised by one skilled in the art within the technical scope of the disclosure. Further, the effects and predictable effects based on the configurations in the disclosure are to be included within the range of the disclosure though not explicitly described in the description of the implementations.

What is claimed is:

1. A dishwasher, comprising:
   a tub that defines a wash space configured to accommodate one or more objects to be washed;
   a sump that is configured to store wash water;
   a water supply pump that supplies the wash water to the tub;
   a base that is disposed below the tub, and provides a space to accommodate the sump and the water supply pump;
   an air supply device that is configured to supply air to the tub;
   a first filter that is disposed at the base and in fluid communication with the tub and the air supply device, the first filter being configured to filter the air;
   a second filter that is disposed at the base and in fluid communication with the tub, the second filter being configured to filter the wash water; and
   a water supply that is connected to the second filter and configured to supply the wash water,
   wherein the first filter is disposed to be spaced from the sump on one lateral direction of the tub, and the second filter is disposed to be spaced from the sump on the other lateral direction of the tub.

2. The dishwasher of claim 1, wherein the first filter comprises:
   a casing that defines an accommodation space;
   an air filter disposed in the accommodation space of the casing and configured to filter foreign substances in air; and
   a cap mounted on the casing to replace the air filter,
   wherein the cap is disposed to protrude from a bottom surface of the tub to be exposed inside the tub.

3. The dishwasher of claim 2, wherein the casing comprises a stopper that protrudes from a surface of the casing and has a ring shape and protrudes radially outward.

4. The dishwasher of claim 2, wherein the casing has a first side that is in fluid communication with the tub and a second side that is in fluid communication with the air supply device, and
   wherein the cap is detachably disposed at the casing.

5. The dishwasher of claim 2, wherein at least a portion of the casing is configured to be exposed to the bottom surface of the tub based on the cap being detached from the casing.

6. The dishwasher of claim 2, wherein the casing passes through a first penetration hole provided on the bottom surface of the tub, and at least a portion of the casing is exposed.

7. The dishwasher of claim 2, wherein the casing comprises an air suction part formed so that external air is suctioned in a radial direction of the air filter toward a center of the air filter, and
   wherein air suctioned in through the air suction part descends to a lower part of the air filter and is supplied to the air supply device.

8. The dishwasher of claim 2, wherein the tub further defines:
   a first penetration hole at the bottom surface of the tub, the first filter being disposed in the first penetration hole; and
   a second penetration hole at the bottom surface of the tub, the second filter being disposed in the second penetration hole.

9. The dishwasher of claim 1, wherein the air supply device comprises:

a housing that defines a flow path configured to guide the air, the housing having an outlet configured to discharge the air from the flow path;

an air blowing fan disposed in the housing and configured to cause the air to flow along the flow path; and a heater that is at least partially disposed in the housing and configured to heat the air blown by the air blowing fan.

10. The dishwasher of claim 9, wherein the first filter and the heater are in fluid communication with each other, and the air blowing fan is disposed between the first filter and the heater.

\* \* \* \* \*